United States Patent
Kitayama

(10) Patent No.: US 6,574,446 B2
(45) Date of Patent: Jun. 3, 2003

(54) IMAGE FORMING APPARATUS HAVING DRIVE TRANSMITTING MEMBER

(75) Inventor: Kunihiko Kitayama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/918,462

(22) Filed: Aug. 1, 2001

(65) Prior Publication Data

US 2002/0025191 A1 Feb. 28, 2002

(30) Foreign Application Priority Data

Aug. 2, 2000 (JP) ........................................ 2000-233915

(51) Int. Cl.⁷ .............................................. G03G 21/16
(52) U.S. Cl. ...................................... 399/111; 399/167
(58) Field of Search ................................. 399/111, 115, 399/116, 117, 119, 167, 265, 279, 222; 464/112, 113, 153, 161, 121

(56) References Cited

U.S. PATENT DOCUMENTS

| | | | | |
|---|---|---|---|---|
| 4,065,941 A | * | 1/1978 | Aoki ........................... | 464/115 |
| 4,692,127 A | * | 9/1987 | Wagner ........................ | 403/56 |
| 4,835,565 A | * | 5/1989 | Nagatsuna et al. .......... | 399/119 |
| 5,070,366 A | * | 12/1991 | Tsuchiya ..................... | 399/162 |
| 5,132,728 A | * | 7/1992 | Suzaki et al. ................ | 399/167 |
| 5,491,542 A | | 2/1996 | Nagashima et al. | |
| 5,583,630 A | * | 12/1996 | Kimura et al. ............... | 399/227 |
| 5,669,046 A | * | 9/1997 | Yoshida et al. .............. | 399/167 |

FOREIGN PATENT DOCUMENTS

JP   11-303883 A  * 11/1999 ............. F16D/3/26

* cited by examiner

Primary Examiner—Robert Beatty
(74) Attorney, Agent, or Firm—Fitzpatrick, Cella, Harper & Scinto

(57) ABSTRACT

An image forming apparatus includes a process unit detachably mountable to a main assembly of the apparatus, the process unit including an image bearing member for bearing an electrostatic image and a process unit actable on the image bearing member, the process unit having a rotational shaft; a driving shaft, substantially co-axial with the rotational shaft, for rotating the rotational shaft; and a drive transmitting member, engaged with the driving shaft and with the rotational shaft, for transmitting a driving force to the rotational shaft from the driving shaft. The drive transmitting member is engaged with the driving shaft with play and is engaged with the rotational shaft with play.

38 Claims, 17 Drawing Sheets

(a)

(b)

(a)

(b)

IMAGE FORMING APPARATUS HAVING DRIVE TRANSMITTING MEMBER

FIELD OF THE INVENTION AND RELATED ART

The present invention relates to an image forming apparatus.

The service life of the image bearing member, or the like, of an image forming apparatus is shorter than that of the main assembly of the image forming apparatus. Therefore, it is a common practice to render the image forming member or the like exchangeably mountable in the main assembly by placing it in a cartridge, or a so-called process cartridge.

A process cartridge needs to receive driving force from the main assembly of an image forming apparatus in which it is mounted.

In one of the methods for transmitting driving force from the main assembly of an image forming apparatus to a process cartridge, the drive shaft on the process cartridge side is directly connected to the drive shaft on the apparatus main assembly side, eliminating the need for driving force transmission gears. In other words, driving force is transmitted through a simple structure.

However, if a process cartridge is provided with a plurality of members to be driven by the driving force transmitted thereto from the apparatus main assembly side, it is rather difficult to accurately position the drive shafts of the plurality of members on the process cartridge side so that they perfectly align with the corresponding drive shafts on the apparatus main assembly side.

In a structural arrangement in which a drive shaft is connected to a drive shaft in a virtually straight line as described above, if the position of a drive shaft on the driving side, or a driving shaft, and the position of a drive shaft on the driven side, or a driven shaft, are misaligned in terms of the axial direction of the drive shaft and driven shaft before they are connected, the two shafts become connected in such a manner that their rotational axes remain slanted relative to each other. Such connection makes the contact points between the two shafts nonuniform in terms of the amount of the driving force transmitted through each contact point. As a result, a certain amount of driving force is diverted from the direction in which the driving force is to be transmitted, causing a process cartridge to vibrate.

SUMMARY OF THE INVENTION

The primary object of the present invention is to provide an image forming apparatus, in which even if the shafts of the plurality of components within a process cartridge having been removably mounted in the main assembly of the image forming apparatus are not in perfect alignment with the corresponding drive shafts on the apparatus main assembly side, a driving force is transmitted from the driving shafts, or the drive shafts on the main assembly side, to the shafts to be driven, or the shafts on the process cartridge side, without causing vibrations.

According to an aspect of the present invention, there is provided an image forming apparatus comprising: a process unit detachably mountable to a main assembly of said apparatus, said process unit including an image bearing member for bearing an electrostatic image and process means actable on said image bearing member, said process means having a rotational shaft; a driving shaft, substantially co-axial with said rotational shaft, for rotating said rotational shaft; and a drive transmitting member, engaged with said driving shaft and with said rotational shaft, for transmitting a driving force to said rotational shaft from said driving shaft, wherein said drive transmitting member is engaged with said driving shaft with a play and is engaged with said rotational shaft with a play.

According to another aspect of the present invention, there is provided a process cartridge detachably mountable to an image forming apparatus, said process cartridge comprising an image bearing member for bearing an electrostatic image; process means actable on said image bearing member, said process means including a rotational shaft; and a drive transmitting member for receiving a driving force from a driving shaft provided in a main assembly of the apparatus; wherein said drive transmitting member is engageable with said driving shaft with a play and is engaged with said rotational shaft with a play.

According to a further aspect of the present invention, it is preferable that in said apparatus, said image bearing member has a rotational shaft which is engaged with a driving shaft provided in the main assembly of the apparatus with a play which is smaller than the play with which said drive transmitting member is engaged with said driving shaft or with said rotational shaft.

According to a further aspect of the present invention, it is preferable that in said process cartridge, said image bearing member has a rotational shaft which is engageable with a driving shaft provided in the main assembly of the apparatus with a play which is smaller than the play with which said drive transmitting member is engaged with said driving shaft or with said rotational shaft.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinafter, the preferred embodiments of the present invention will be described with reference to the appended drawings.

<Embodiment 1>

Figure 13:
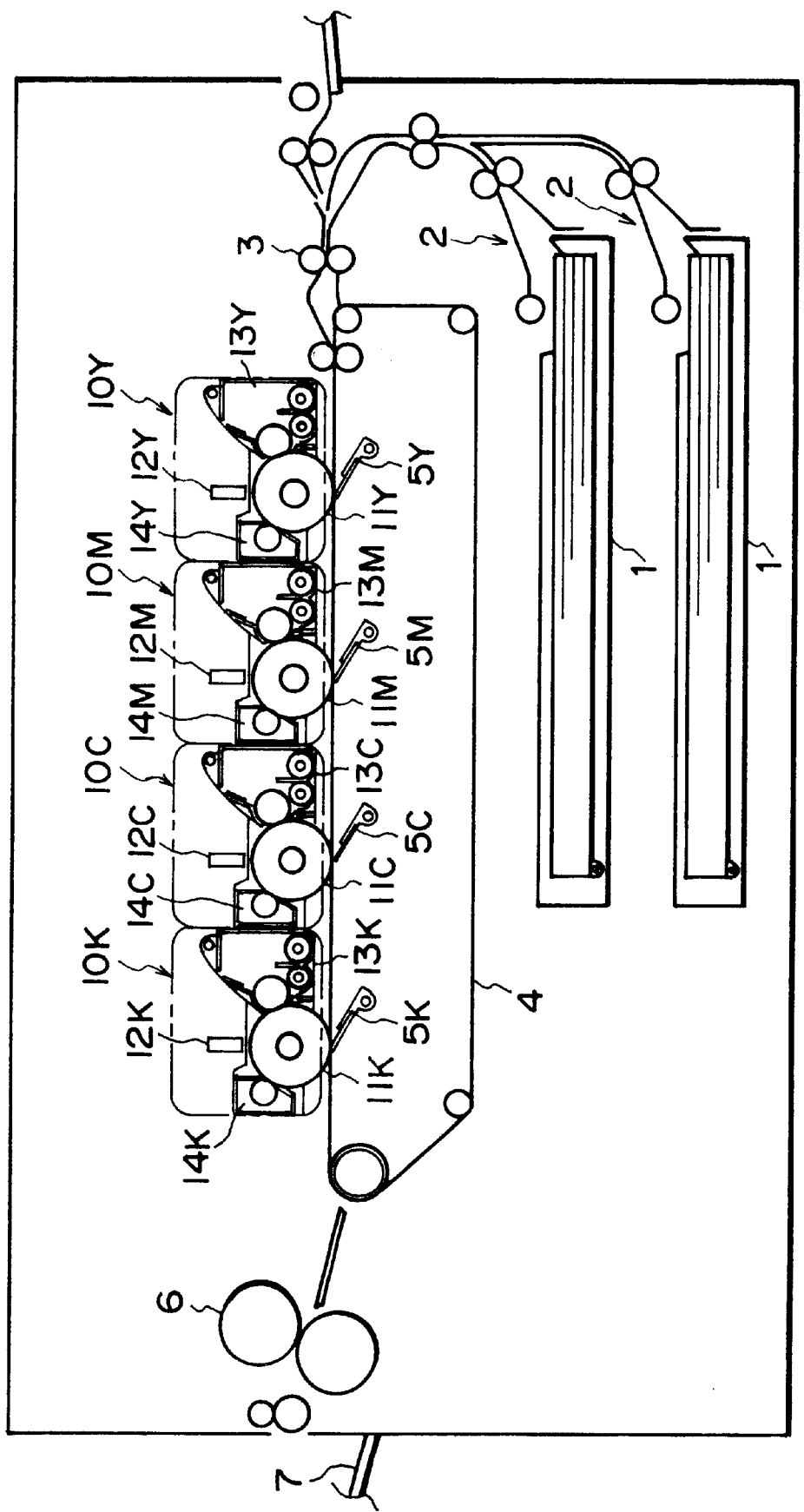
FIG. 13 is a sectional view of an image forming apparatus (full-color copying machine) in accordance with the present invention.

FIG. 13 is a vertical sectional view of a full-color copying machine as an image forming apparatus in accordance with the present invention. This full-color image forming apparatus is such an apparatus that forms a full-color image by placing in layers four toner images different in color, that is, yellow, magenta, cyan and black toner images.

Figure 14:
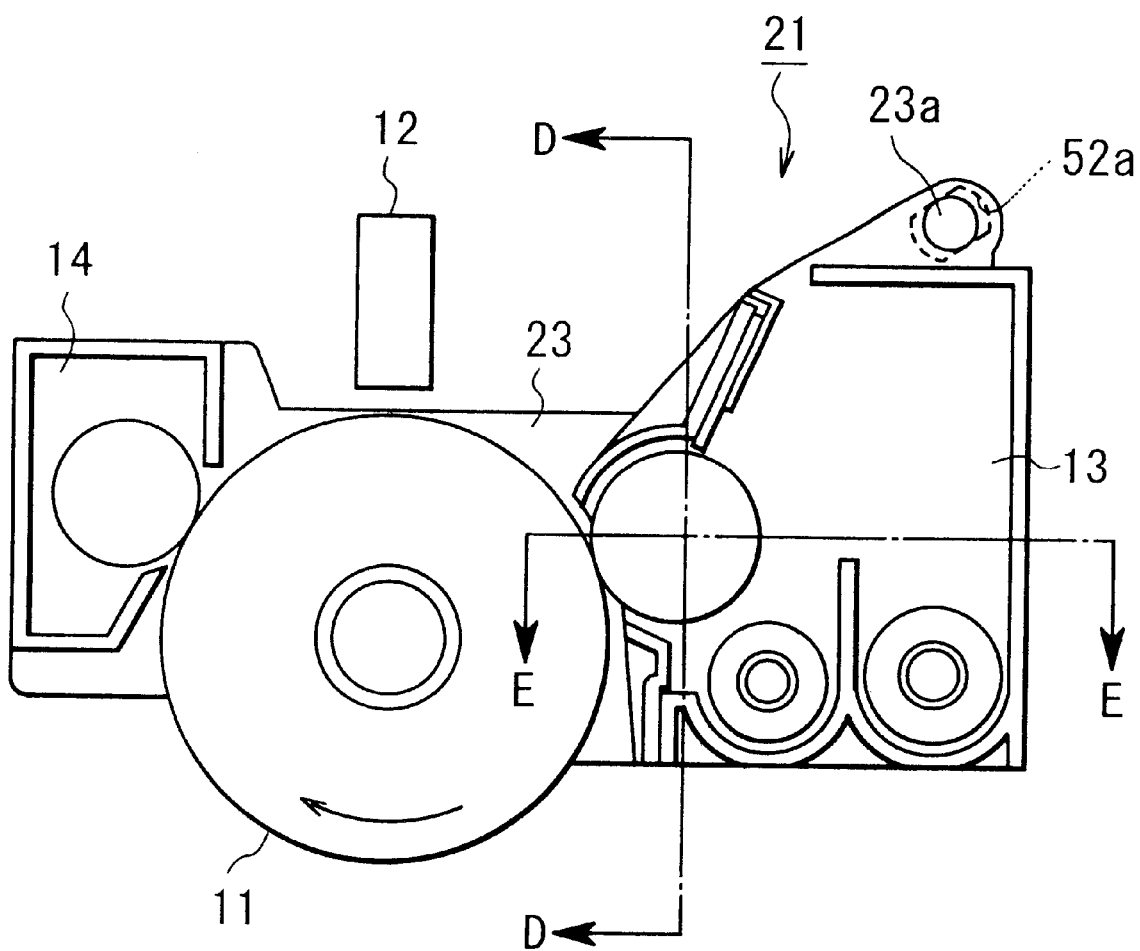
FIG. 14 is a sectional view of the image forming portion of the image forming apparatus in accordance with the present invention.

Referring to FIG. 13, referential codes 10Y, 10M, 10C and 10K designate yellow, magenta, cyan and black toner image forming stations. FIG. 14 is an enlarged sectional view of one of the image forming stations.

A plurality of sheets of recording paper are stored in a cassette 1, and are fed out of the cassette 1 into the main assembly of the image forming apparatus in a sheet feeding station 2. Then, the recording paper conveyed to a registration roller 3, by which the recording paper is rectified in alignment or the like, if it is askew or in the like conditions, and then, is released to be conveyed to a transfer belt 4 with a proper timing. Meanwhile, a latent image is formed on each of the photosensitive drums 11Y, 11M, 11C and 11K, by signals which reflect image formation data sent from the output apparatus (unshown) of an unshown reading apparatus or computer.

After being released by the registration roller 3, the recording paper is electrostatically adhered to a transfer belt 4, and is conveyed by the transfer belt 4, passing under the image forming stations 10Y, 10M, 10C and 10K.

In the image forming stations 10Y, 10M, 10C and 10K, LED heads 12Y, 12M, 12C and 12K, developing apparatuses 13Y, 13M, 13C and 13K, and charging devices 14Y, 14M, 14C and 14K are disposed in a manner to surround the peripheral surfaces of the photosensitive drums 11Y, 11M, 11C and 11K, correspondingly, and yellow, magenta, cyan and black toner images, are formed on the peripheral surfaces of the photosensitive drums 10Y, 10M, 10C and 10K, correspondingly, through an electrophotographic process. These toner images are consecutively transferred onto the recording paper by the functions of the transferring means 5Y, 5M, 5C and 5K. In the transfer station, in which the transfer belt 4 comes virtually in contact with the photosensitive drums 11Y, 11M, 11C and 11K.

After the four color toner images are transferred onto the recording paper, the transfer paper is separated from the transfer belt, based on the resiliency of the recording paper and the curvature of the transfer belt 4, and is conveyed to a fixing station 6, in which the toner images are fixed to the recording paper with the application of heat and pressure. Thereafter, the recording paper is discharged into a delivery tray 7, ending a single cycle of a copying operation.

Figure 15:
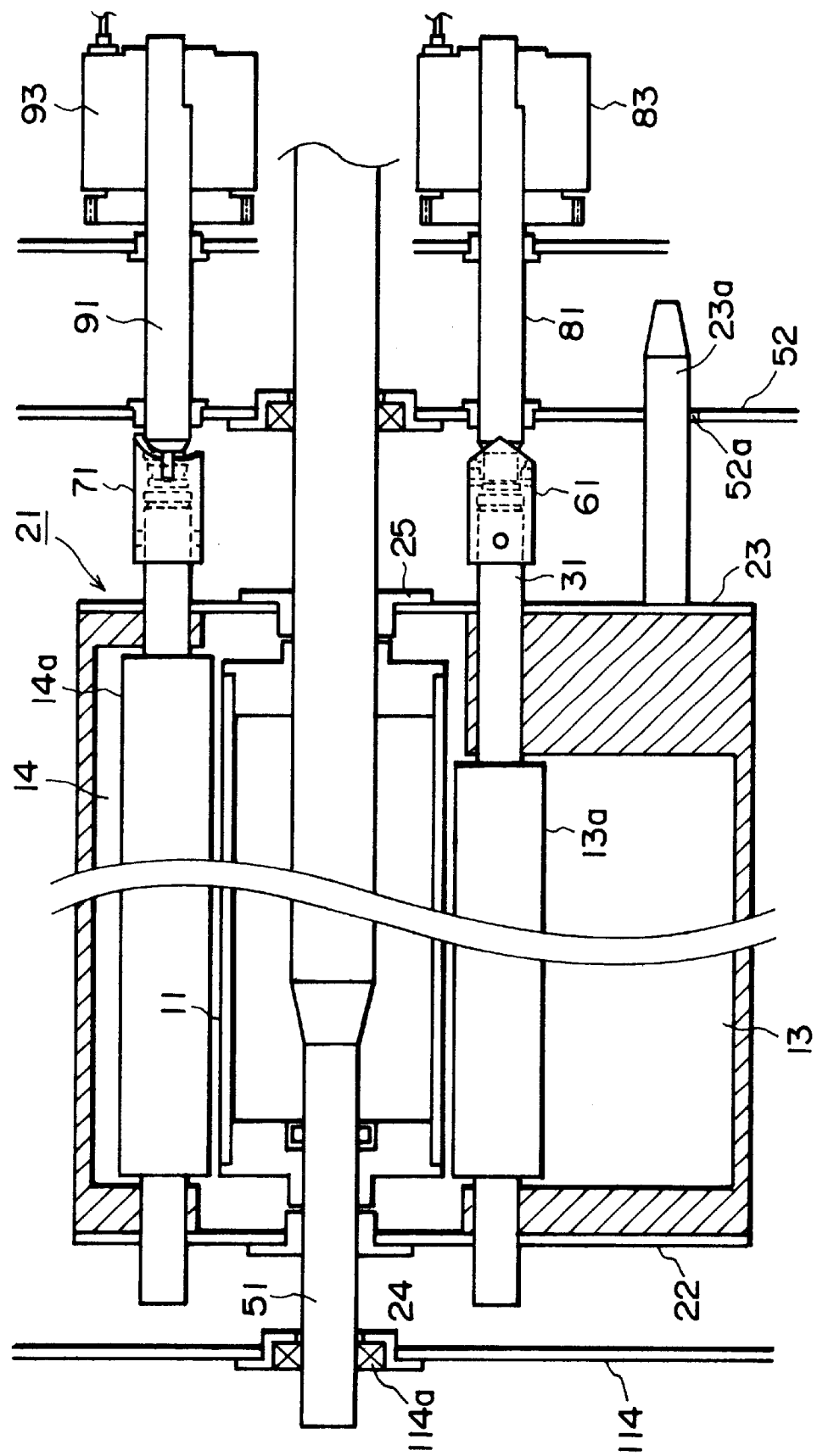
FIG. 15 is a sectional view of the image forming portion and its drive train in the image forming apparatus in accordance with the present invention.

Next, referring to FIGS. 14 and 15, a process cartridge 21 will be described. FIG. 15 is a rough sectional view of the process cartridge and driving train therefor, for showing the structure thereof.

The process cartridge 21 comprises a photosensitive drum 11, a developing device 13, and an injection type charging device 14, which are integrally supported by the side plates 22 and 23 of the process cartridge 21 as shown in FIG. 15. This image forming apparatus is configured so that the process cartridge 21 can be removably mountable in the main assembly of the image forming apparatus in the front-to-rear direction of the image forming apparatus; in other words, all, one, or some of the components disposed within the process cartridge can be replaced or maintained to maintain the image forming apparatus.

The position of the photosensitive drum 11 relative to the side walls 22 and 23 is not fixed; it becomes fixed as the photosensitive drum 11 is fitted around the drum shaft 51 when the process cartridge 21 is mounted into the apparatus main assembly. In comparison, the positions of the developing device 13 and injection type charging device 14 relative to the side plates 22 and 23 are fixed. More specifically, fitting a pin 23a projecting from the side plate 23 in one end (smaller diameter portion) of the elongated hole 52a of the side plate 52 on the main assembly side after fitting the drum shaft 51 into the bearing portions 24 and 25 of the side plates 22 and 23, respectively, fixes the positional relationship between the side plates 22 and 23 and developing device 13, as well as the positional relationship between the side plates 22 and 23 and the injection type charging device 14.

As for the development sleeve 13a of the developing device 13 and the injection sleeve 14a of the injection type charging device 14, their distances from the bearings 24 and 25 are precisely adjusted when they are attached to the side plates 22 and 23. Thus, the positional relationships between the development sleeve 13a and the drum shaft 51, and between the injection sleeve 14a and the drum shaft 51, in terms of the radius direction of the photosensitive drum 11, are highly precisely fixed as the process cartridge 21 is mounted into the apparatus main assembly. Further, since the position of the photosensitive drum 11 is also fixed relative to the drum shaft 51, the clearance (SD gap) between the peripheral surfaces of the development sleeve 13a and photosensitive drum 11, and the clearance (SC gap) between the peripheral surfaces of the photosensitive drum 11 and injection sleeve 14a, are highly precisely set.

Referring to FIG. 15, the drive shafts 81 and 91 are for driving the development sleeve 13a and injection sleeve 14a, respectively. They are disposed so that they will be connected in a straight line with the rotational shafts of the development sleeve 13a and injection sleeve 14a as the process cartridge 21 is mounted into the apparatus main assembly. The drive shafts 81 and 91 are equipped with electromagnetic clutches 83 and 93, respectively, so that they can be rotated with their own predetermined timings. The development sleeve 13a and injection sleeve 14a are fitted with couplings 61 and 71, which are on the clutch side, and through which driving force is transmitted to the development sleeve 13a and injection sleeve 14a from the drive shafts 81 and 91, respectively.

Next, the structure of the driving force transmitting portion will be described in detail.

Figure 1:
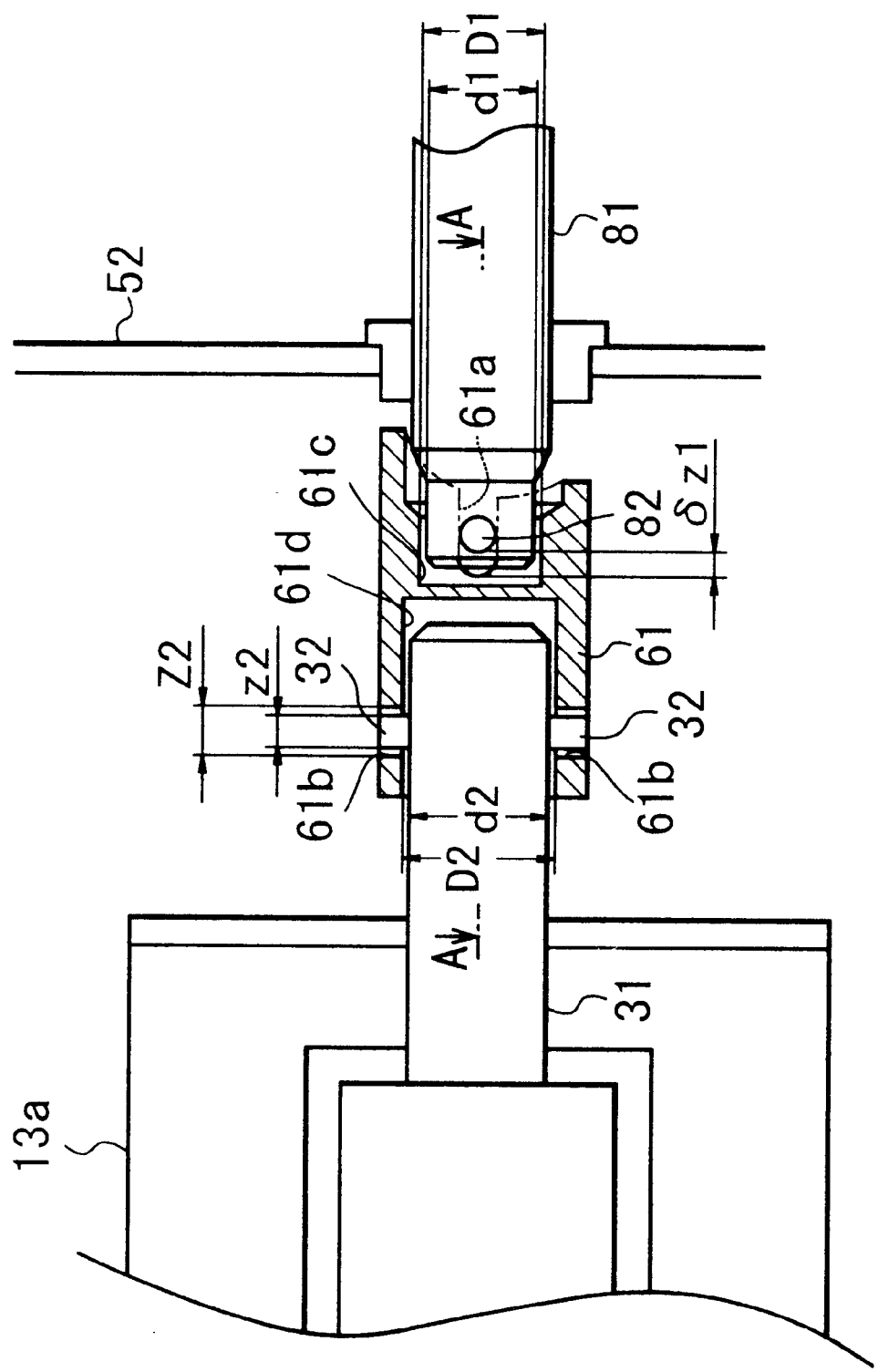
FIG. 1 is a sectional view of the driving force transmitting apparatus in the first embodiment of the present invention, at a plane D—D (line D—D in FIG. 14), for showing the structure thereof.
Figure 2:
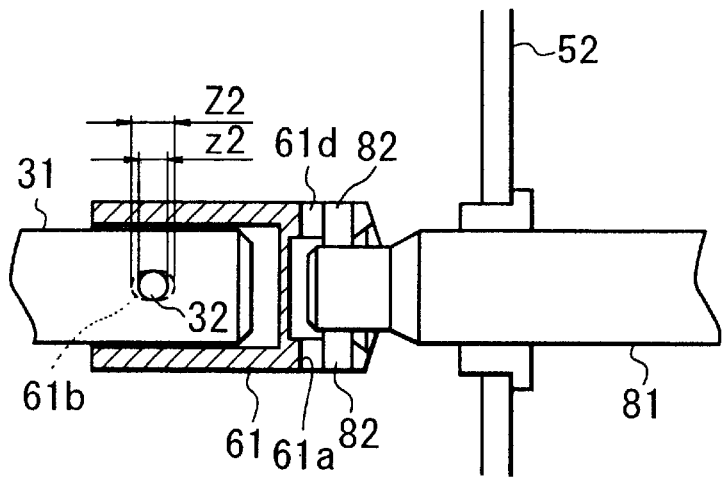
FIG. 2 is a sectional view of the driving force transmitting apparatus in the first embodiment of the present invention, at a plane E—E (line E—E in FIG. 14), for showing the structure thereof.

FIG. 1 is a sectional view of the development sleeve and the drive shaft therefor, at a plane D—D (line D—D in FIG. 14). FIG. 2 is a sectional view of the development sleeve and drive shaft therefor, at a plane A—A in FIG. 1 (line E—E in FIG. 14). Since the structure of the injection type charging device 14 is the same in the structure of the driving force receiving portion as the developing device 13, only the structure of the driving force transmitting portion of the developing device 13 will be described.

The drive shaft 81, and the sleeve shaft 31 of the development sleeve 13a, are provided with pins 82 and 32, which project from the peripheral surfaces of the drive shaft 81 and sleeve shaft 31, respectively. The coupling 61 is provided with a groove 61a and a hole 61b, the positions of which correspond to the positions of the pins 82 and 32, respectively. Driving force is transmitted by the engagements between the pins 81 and groove 61a, and between the pins 32 and holes 61b. The reason why the holes 61b of the coupling 61 are positioned on the sleeve shaft 31 side, and the grooves 61a of the coupling 61, which opens toward the shaft 81, are positioned on the drive shaft 81 side, is that the coupling 61 is to be permanently attached to the sleeve shaft 31, and is to be enabled to be connected to, or disconnected from, the drive shaft 81.

The coupling 61 is provided with cylindrical portions 61c and 61d, into the hollows of which the ends of the drive shaft 81 and sleeve shaft 31 are inserted, respectively. The external diameter d1 of the drive shaft 81 is 6 mm, whereas the internal diameter D1 of the cylindrical portion 61c of the coupling 61 is 7 mm. Further, the external diameter d2 of the sleeve shaft 31 is 8 mm, whereas the internal diameter D2 of the cylindrical portion 61d of the coupling 61 is 8.5 mm. Therefore, there are a relatively large amount of play between the drive shaft 81 and the internal surface of the coupling 61, and also a relatively large amount of play between the sleeve shaft 31 and the internal surface of the coupling 61, in terms of their radius direction. The pin 82 which is put through the drive shaft 81 is the same in diameter as the pin 32 which is put through the sleeve shaft 31, and is 2 mm in diameter.

Play is also provided between the pin 82 and the bottom of the groove 61a, and between the pin 32 and the wall of the hole 61b, in terms of the axial direction of the coupling 61. The amount of the play δz1 in terms of the axial direction of the coupling 61 between the drive shaft 81 and the bottom of the groove 61a is 2 mm. The dimension z2 of the pin 32 of the sleeve shaft 31 in terms of the thrust direction of the coupling 61, that is, the diameter of the pin 32, is 2 mm, whereas the dimension z2 of the hole 61b in terms of the thrust direction of the coupling 61, that is, the length of the long axis of the hole 61b, is 3 mm. Therefore, there is a play of 0.5 mm between the pin 32 and each end of the hole 61b in terms of the thrust direction of the coupling 61. The standard for this play is no less than 100 μm on each side of the pin 32, or a total of no less than 200 μm.

As described above, in this embodiment, a predetermined amount of play is provided between the drive shaft 81 and the internal surface of the coupling 61 in terms of the radius direction of the coupling 61, and a predetermined amount of play is provided between the sleeve shaft 31 and the internal surface of the coupling 61 in terms of the radius direction of the coupling 61. Further, a predetermined amount of play is provided between the pin 82 of the drive shaft 81 and the bottom of the groove 61a in terms of the axial direction of the coupling 61, and a predetermined amount of play is provided between the pin 32 of the sleeve shaft 31 and the opposing ends of the hole 61b, in terms of the axial direction of the coupling 61. Therefore, the coupling 61 is allowed to wobble relative to the drive shaft 81 and sleeve shaft 31.

Figure 3:
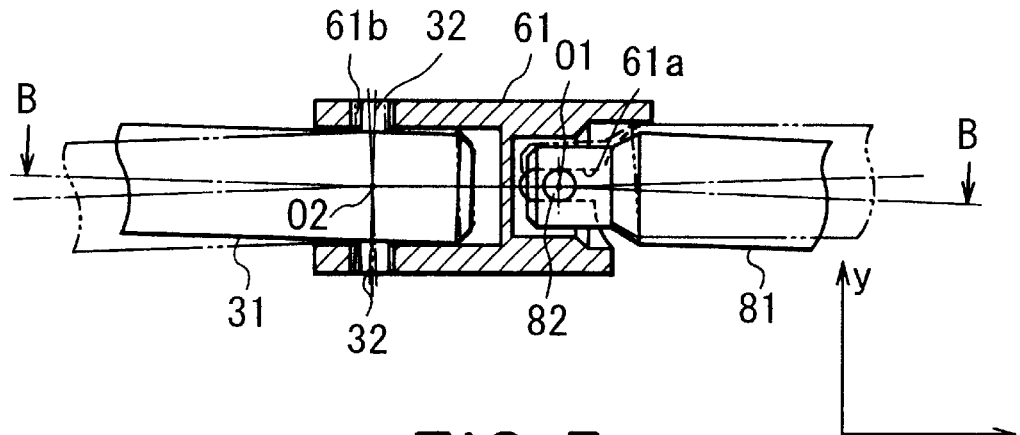
FIG. 3 is a sectional view of the driving force transmitting portion of the driving force transmitting apparatus in the first embodiment of the present invention, for showing the movement thereof.
Figure 4:
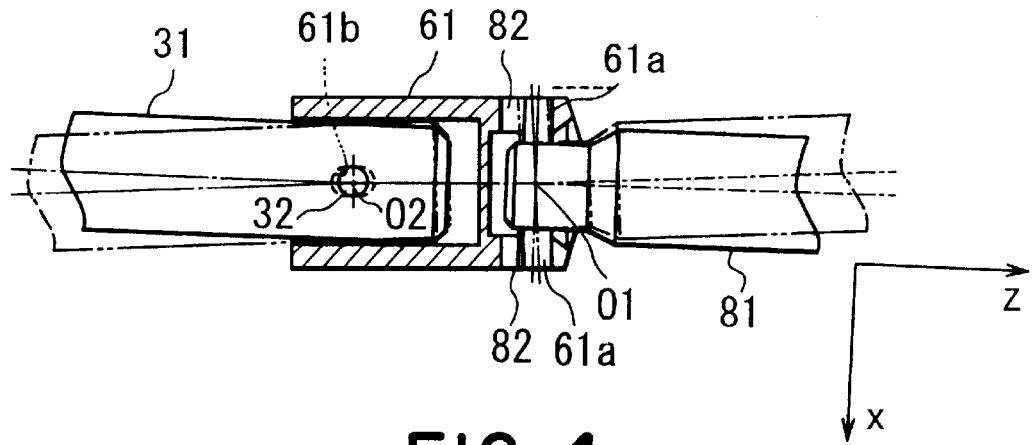
FIG. 4 is a sectional view of the driving force transmitting portion of the driving force transmitting apparatus, at a plane B—B in FIG. 3.

Referring to FIG. 3, and FIG. 4 (sectional view at line B—B in FIG. 3), give a rough depiction of the manner in which the coupling 61 is allowed to wobble. Referring to FIG. 3, in which the axis perpendicular to the plane of this drawing is designated by a referential code x; the vertical direction in this drawing is designated by a referential code y, and the horizontal direction in this drawing is designated by a referential code z, the coupling 61 is allowed to pivot about the axis x, relative to the sleeve shaft 31. Referring to FIG. 4, the coupling 61 is allowed to pivot about the axis y, relative to the sleeve shaft 31. Since the axes x and y are perpendicular to each other, the coupling 61 is allowed to wobble about the intersection O2 between the axial line of sleeve shaft 31 and the axial line of the pin 32 of the sleeve shaft 31. Similarly, the coupling 61 is allowed to wobble about the intersection O1 between the axial line of the drive shaft 81 and the axial line of the pin 82 of the drive shaft 81.

Figure 5:
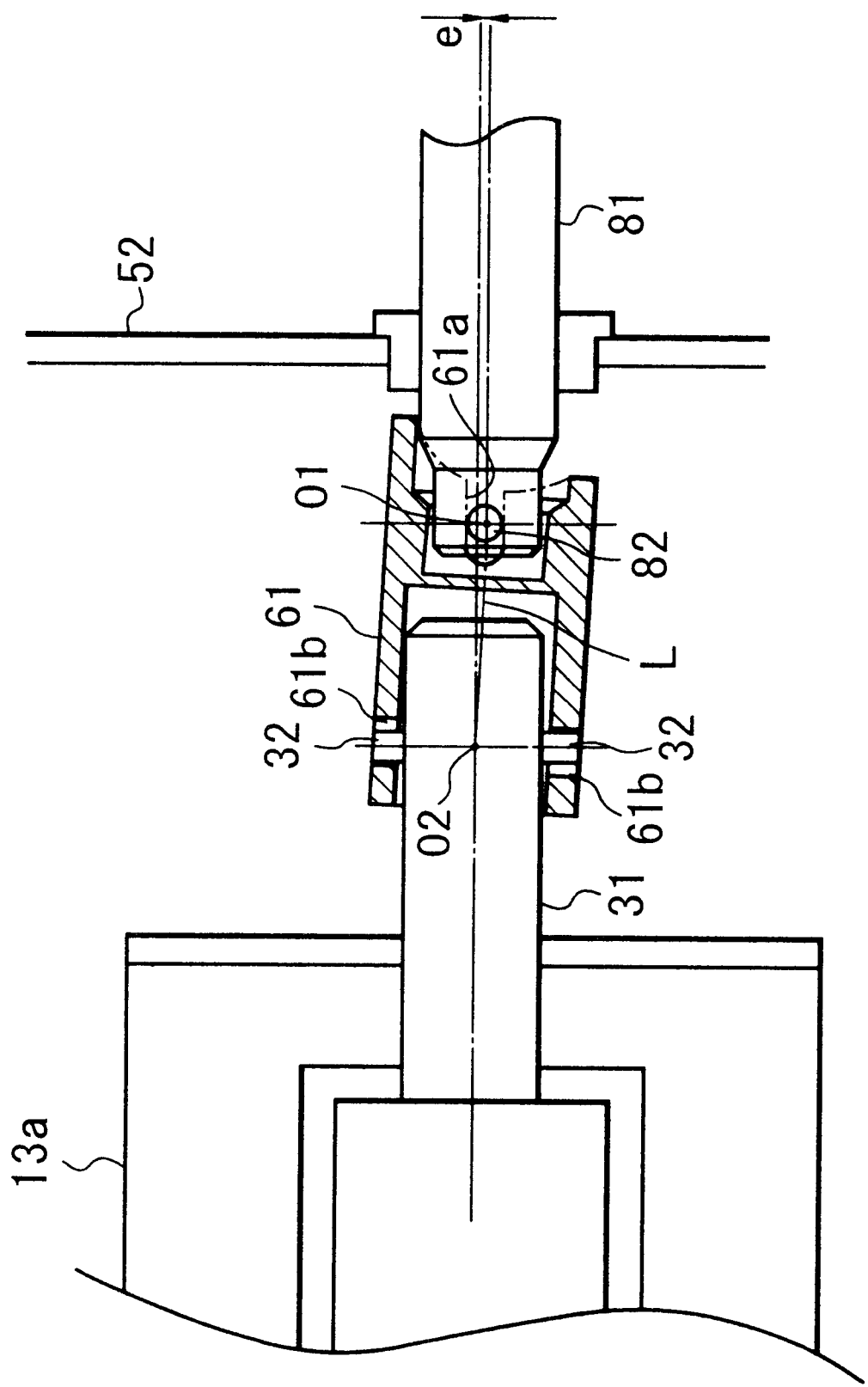
FIG. 5 is a sectional view of the driving force transmitting apparatus in the first embodiment of the present invention, in which the rotational axis of the driving shaft of the driving force transmitting apparatus is not in perfect alignment with the rotational axis of the sleeve shaft.

FIG. 5 is a drawing for showing the positional relationship between the drive shaft 81 and sleeve shaft 31, with the interposition of the coupling 61, in which the axial lines of the two shafts are not in a straight line. As described before, the sleeve shaft 31 is not directly aligned with the drive shaft 81. Therefore, there is a possibility that the sleeve shaft 31 will become misaligned from the drive shaft 81 by an amount equivalent to the sum of the tolerances of the components interposed between the sleeve shaft 31 and drive shaft 81. In the case of the positional relationship between the sleeve shaft 31 and drive shaft 81 shown in FIG. 5, the amount of the misalignment e between the two shafts is 0.5 mm.

Further, the angle θ (θ<180 deg.) between the axial line of the driving force transmitting means, and the driving shaft or driven shaft, is approximately 2.2 deg. The range of the pivoting of the driving force transmitting means in terms of the angle relative to its radius direction is approximately 2.4 deg., and the range of the wobbling of the driving force transmitting means in terms of the angle relative to its axial line is approximately 4.8 deg. As is evident from the above description, since the range of the wobbling angle of the driving force transmitting means is rendered greater than the angle between the axial line of the driving force transmitting means and the axial line of the drive shaft or driven shaft, the driving force transmitting means is allowed to operate without interfering with the movements of the two shafts.

In other words, in this embodiment, the drive shaft 81 and sleeve shaft 31 are indirectly connected to each other with the interposition of the coupling 61 which is allowed to wobble. Therefore, even if the drive shaft 81 and sleeve shaft 31 are not in alignment with each other, a driving force is smoothly transmitted from the drive shaft 81 to the sleeve shaft 31 through the coupling 61. Therefore, it does not occur that the process cartridge 21, which is a unit to be driven, vibrates as a driving force is transmitted thereto. Next, the reason why the process cartridge 21 does not vibrate even if the drive shaft 81 and sleeve shaft 31 are not in alignment with each other will be described in more detail.

Referring to FIG. 5, when the drive shaft 81 is not in alignment with the sleeve shaft 31, the coupling 61 becomes tilted. In this situation, the axial line of the coupling 61 intersects with both the intersection O1 of the axial lines of the pin 82 and drive shaft 81 and the intersection O2 of the axial lines of the pin 32 and sleeve shaft 31.

Thus, the coupling 61 is allowed to remain tilted while it rotates as the drive shaft 81 rotates, because the coupling 61 is allowed to pivot about the aforementioned two axes x and y, relative to the drive shaft 81 as described with reference to FIGS. 3 and 4. The relationship between the coupling 61 and sleeve shaft 31 are the same as that between the coupling 61 and drive shaft 81.

In this structural arrangement, the axial line of the drive shaft 81 intersects with the axial line L of the coupling 61 at the point at which drive force transmission occurs (contact point between pin 82 and the wall of the groove 61a), and the axial line of the sleeve shaft 31 intersects with the axial line L of the coupling 61 at the point at which driving force transmission occurs (contact point between pin 32 and the wall of the hole 61b). Therefore, a plurality of the contact points between the pin 82 and the wall of the groove 61, and between the pin 32 and the wall of the hole 61b, which are on the same cylindrical plane, and at which driving force is transmitted, become equal in the amount of driving force to be transmitted; driving force is evenly distributed among the plurality of driving force transmission points, as it is transmitted. Consequently, driving force, or torque, is simply transmitted as torque, without being partially turned into unwanted force, or the vibration causing force, as it is transmitted. Therefore, vibrations do not occur. As is evident from the above description, this embodiment can prevent driving force from being partially turned into the vibration causing force as it is transmitted, preventing therefore the driven unit from vibrating.

In this embodiment, the groove 61a and hole 61b of the coupling 61 are differentiated from each other by 90 deg. in rotational phase. Next, the reason therefor will be described.

Referring to FIGS. 3 and 4, attention will be paid to the movements of the sleeve shaft 31 and coupling 61 relative to each other. As shown in the drawings, the coupling 61 is pivotable about the axes x and y, relative to the sleeve shaft 31. However, the pivotal movement of the coupling 61 about the axis x is different in dynamics from the pivotal movement of the coupling 61 about the axis y. More specifically, the pivotal movement of the coupling 61 relative to the sleeve shaft 31 shown in FIG. 3 involves the movements of the pin 32 and the hole 61b relative to each other, whereas the pivotal movement of the coupling 61 relative to the sleeve shaft 31 shown in FIG. 4 does not involve the movements of the pin 32 and hole 61b shown in FIG. 3. More specifically, the former causes the peripheral surface of the pin 32 and the wall of the hole 61b to slide against each other in the axial direction of the coupling 61, whereas the latter causes the peripheral surface of the pin 32 and the wall of the hole 61b to slide against each other in the circumferential direction of the pin 32. Thus, the former is greater in slide resistance (frictional resistance) than the latter.

As the coupling 61 and sleeve shaft 31 rotate while being misaligned with each other, the state depicted in FIG. 3 and the state depicted in FIG. 4 alternately occur, causing the amount of the slide resistance (frictional resistance) to periodically fluctuate.

Figure 6:
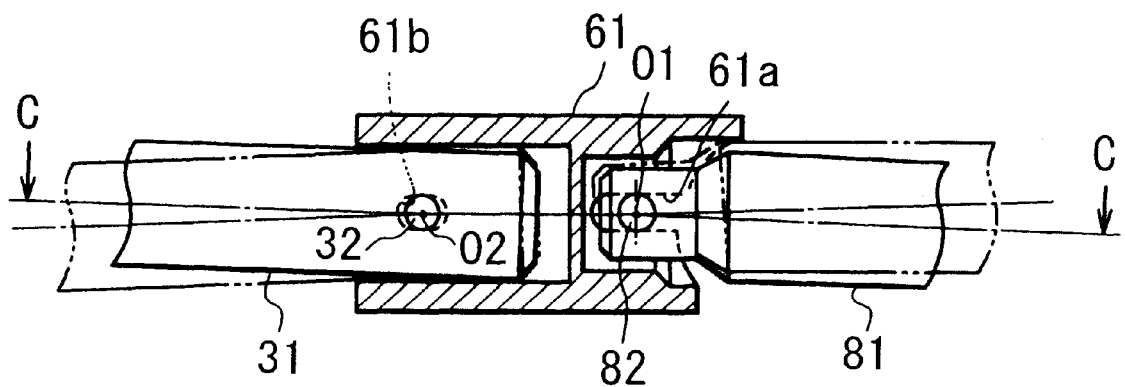
FIG. 6 is a sectional view of the driving force transmitting portion of the driving force transmitting apparatus in the first embodiment of the present invention, for analytically showing different aspects of the driving force transmission.
Figure 7:
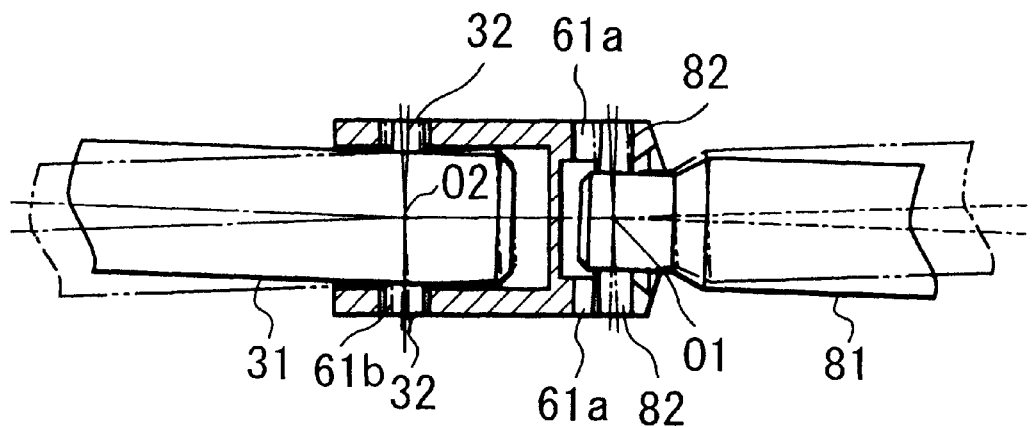
FIG. 7 is a sectional view of the driving force transmitting apparatus in the first embodiment of the present invention, at a plane C—C (line C—C) in FIG. 6.

In the case of the driving force transmitting means shown in FIG. 6, and FIG. 7 (sectional view at line C—C in FIG. 6), the groove 61a and hole 61b are rendered coincidental in rotational phase, which is different from the structural arrangement shown in FIGS. 3 and 4. In the state shown in FIG. 6, the sleeve shaft 31 and drive shaft 81 are both relatively small in slide resistance (frictional resistance), whereas in the state shown in FIG. 7, they are both relatively large in the slide resistance (frictional resistance). In other words, in the case of the structure shown in FIGS. 6 and 7, the periodic fluctuation in slide resistance (frictional resistance) between the shafts 31 and the coupling 61, which is caused by their rotation, and the periodic fluctuation in slide resistance (frictional resistance) between the drive shaft 81 and the coupling 61, which is caused by their rotation, become coincidental in phase. Therefore, the amplitude of the periodic fluctuation in the total slide resistance (frictional resistance) of the coupling 61 is the simple sum of the slide resistance (frictional resistance) on the sleeve shaft side and the slide resistance (frictional resistance) on the drive shaft side, that is, virtually twice the slide resistance (frictional resistance) on one side. In other words, the amplitude is quite large. If the change in the amplitude of the periodic fluctuation in the slide resistance (frictional resistance) is as large as the above described one, the change sometimes causes changes in rotational load, which results in an undesirably phenomenon; for example, the change in rotational load causes the driven shaft to irregularity rotate, and/or causes the driving portion on the upstream side of the driving shaft to vibrate (in the case of an image forming apparatus, it is possible that image density irregularity will be caused by the rotational irregularity).

In comparison, in the case of the structural arrangement shown in FIGS. 3 and 4, the groove 61a is differentiated by 90 deg. in rotational phase from the hole 61b. Therefore, the periodic fluctuation in the slide resistance (frictional resistance) on the sleeve shaft 31 side, which is caused by the rotation, become differentiated by 90 deg. in rotational phase from that on the drive shaft 81 side. Thus, when the slide resistance on one side is large, the slide resistance on the other side is small. Consequently, the overall slide resistance (frictional resistance) involving the coupling 61, or the sum of the slide resistance on both the sleeve shaft 31 side and drive shaft 81 side, becomes smaller than each of the slide resistance on the sleeve shaft 31 side and the slide resistance on the drive shaft 81 side, preventing the rotational load from significantly fluctuating.

As described above, differentiating the groove 61a of the coupling 61 by 90 deg. in rotational phase from the hole 61b of the coupling 61 prevents the rotational load from significantly fluctuating, which in turn prevents such problems as irregular rotation.

Next, the process through which coupling 61 becomes engaged with the drive shaft 81 as the process cartridge 21 is inserted into the image forming apparatus main assembly will be described.

Figure 9:
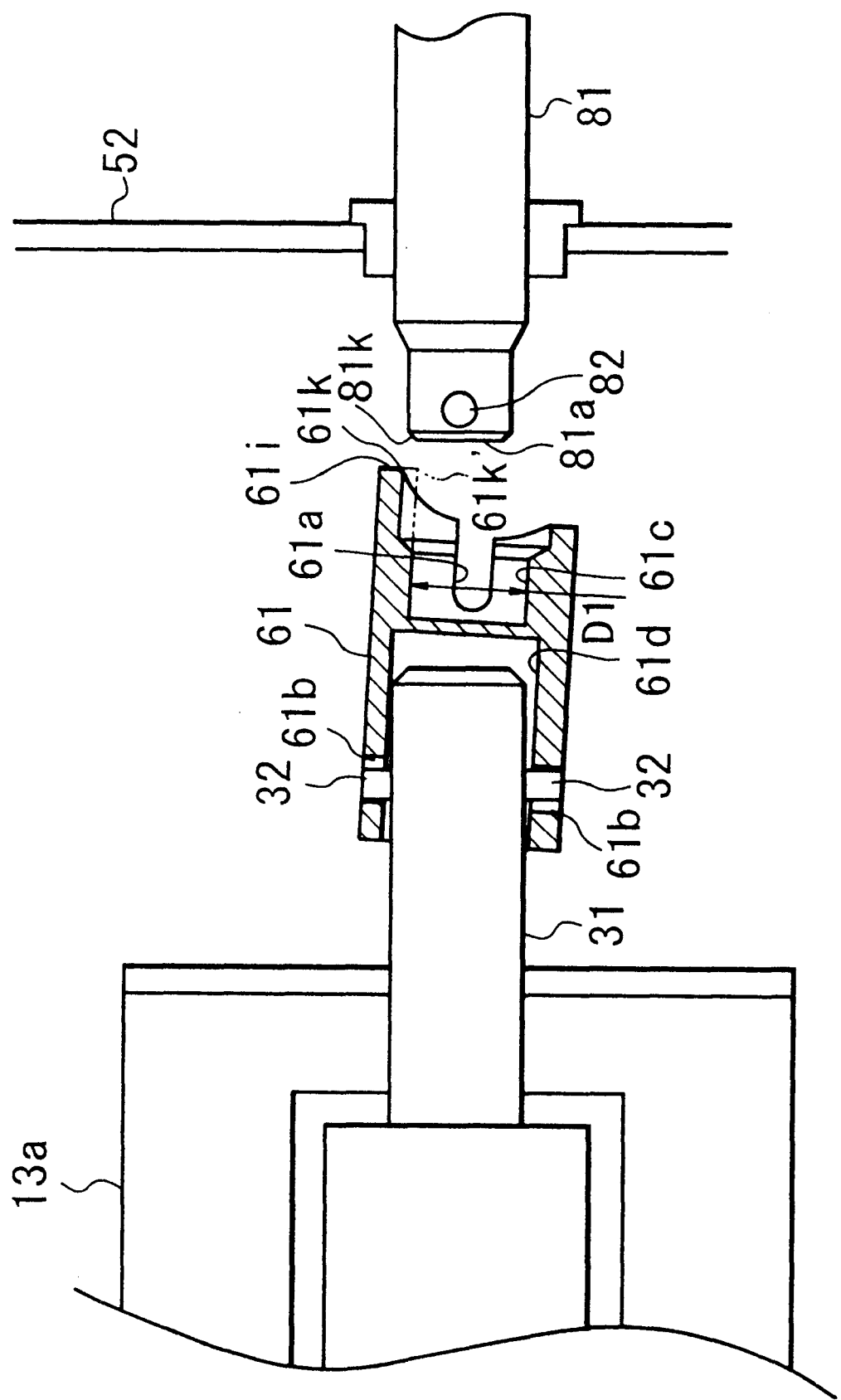
FIG. 9 is a rough side view of the coupling (in sectional view) of the driving force transmitting apparatus, and the driving shaft, in the first embodiment of the present invention, for depicting the process through which the two components engage with each other.

Referring to FIG. 9, before the process cartridge 21 is mounted into the apparatus main assembly, the coupling 61 is resting on the sleeve shaft 31, tilting downward on the drive shaft 81 side. The pin 82 of the drive shaft 81 and the groove 61a of the coupling 61 are not in a specific relationship in terms of rotational phase.

Figure 8:
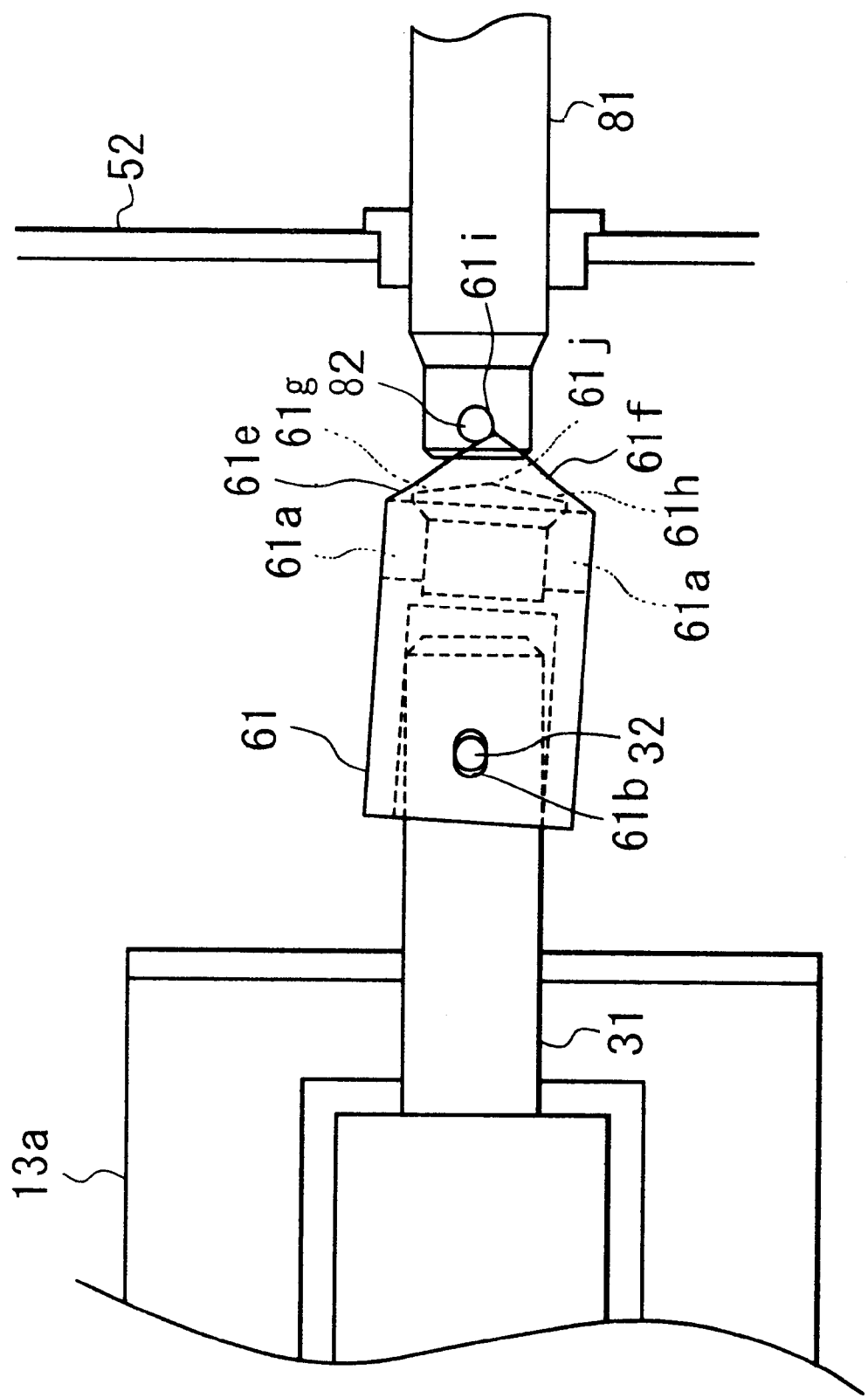
FIG. 8 is a rough side view of the coupling of the driving force transmitting apparatus, and the driving shaft, in the first embodiment of the present invention for depicting the process through which the two components engage each other.

FIG. 8 shows the state of the coupling 61 and its adjacencies, in which the pin 82 is differentiated by 90 deg. in rotational phase from the groove 61a. In order to facilitate the engagement between the pin 82 of the drive shaft 81 and the groove 61a of the coupling 61, which are in a random relationship in terms of rotational phase, (not in alignment with each other in terms of the axial direction of the coupling 61) as shown in FIG. 8, while aligning the pin 82 and groove 61a, the coupling 61 is provided with a couple of tapered portions with slanted surfaces 61e, 61f, 61g and 61h. As the process cartridge 21 is pushed into the apparatus main assembly, the pins 82 of the drive shaft 81 come into contact with the slanted surfaces 61e, 61f, 61g or 61h. As the process cartridge 21 is pushed further into the apparatus main assembly, the drive shaft 81 or sleeve shaft 31 is forced to rotate by the contact between the slanted surfaces and the pin 82 of the drive shaft 81. Eventually, the pin 82 and groove 61a are aligned in terms of the axial direction of the coupling 61, and the pin 82 engages into the groove 61a, ending the engagement between the coupling 61 and the drive shaft 81.

In this structure, an electromagnetic clutch (see FIG. 15) is provided between the drive shaft 81 and a mechanical power source. Therefore, the load exerted by the drive shaft 81 during the idling of the apparatus is in a range of 50–100 gf/cm. In comparison, the load exerted by the development sleeve 13a and the load exerted by the injection sleeve 14a are each in a range of 700–2000 gf/cm. Therefore, the drive shaft 81 side, which is lower in load, rotates. Further, the vertices of the slanted surfaces 61e, 61f, 61g and 61h are differentiated by 90 deg. in rotational phase from the groove 61a. Therefore, the maximum amount of the rotation which the drive shaft 81 must make in order for the pin 82 of the drive shaft 81 to engage into the groove 61b is 90 deg.

Referring to FIG. 8, the coupling 61 is tilted downward on the end drive shaft 81 side. Therefore, if the vertices 61i and 61j of the tapered portions are rendered the same in height in terms of the axial direction of the coupling 61, the pins 82 come into contact with the slanted surfaces 61e and 61g, that is, the slanted surfaces on the top side, one for one, making it impossible for the drive shaft 81 to rotate. In order to prevent the coupling 61 from preventing the drive shaft 81 from rotating, the vertices 61i and 61j of the tapered portions are differentiated in height as shown in FIG. 8. With the provision of this structural arrangement, as the coupling 61 is moved toward the draft shaft 81, one end of the pin 82 comes into contact with the slanted surface 61e, causing the drive shaft 81 to rotate. Then, after the drive shaft 81 is rotated by the further advancement of the coupling 61, the other end of the pin 82 comes in contact with the slanted surface 61h. Therefore, the aforementioned engagement failure between the pins 82 and groove 61b can be avoided.

Next, the avoidance of the head-on collision between the leading end of the coupling 61 in terms of the cartridge insertion, and the end surface of the drive shaft 81 on the coupling 61 side, will be described.

Referring to FIG. 9, in this embodiment, the cylindrical portion 61c of the coupling 61 is provided to portions different in internal diameter, and therefore, there is a step between the two portions different in internal diameter. The double-dot chain line in the FIG. 9 represents a coupling, the cylindrical portion 61c of which is uniform in internal diameter D1 in terms of its axial direction. In this case, the position of a point 61k, that is, the position of the intersection between the vertex 61i of the tapered portion of the cylindrical portion 61c of the coupling 61, and the internal surface of the cylindrical portion 61c of the coupling 61, is lower than the highest point 81k of the end surface 81a of the drive shaft 81, on the coupling 61 side. Therefore, as the process cartridge 21 is inserted into the apparatus main assembly, the leading end 61i of the coupling 61 collides with the end surface 81a of the drive shaft 81, on the coupling 61 side. Thus, in this embodiment, in order to prevent the occurrence of this head-on collision between the coupling 61 and drive shaft 81, the drive shaft 81 side of the cylindrical portion 61c of the coupling 61 is rendered greater in internal diameter to raise the position of the inward end 61k of the leading end 61i, or the position of the inward end of the vertex 61i of the tapered portion of the coupling 61. More concretely, the internal diameter of the drive shaft 81 side of the cylindrical portion 61c of the coupling 61 is increased enough to create a step with a rise or 1 mm, between the internal surface of the inward side of the cylindrical portion 61c and the internal surface of the drive shaft 81 side of the cylindrical portion 61c. Consequently, the position relationship between the highest point 81k of the end surface 81a of the drive shaft 81 and the leading end 61k of the coupling 61 in terms of the vertical direction reverses, preventing the occurrence of the aforementioned engagement failure.

According to an aspect of the present invention, a certain amount of play is provided between the pin 82 and the bottom of the groove 61a, and also between the pin 32 and the wall of the hole 61b, in terms of the axial direction of the coupling 61. In terms of the circumferential direction of the coupling 61, however, play is unnecessary since the same effects as those described above can be obtained without the provision of play in the circumferential direction of the coupling 61.

As described above, even if the above described play in terms of the circumferential direction of the coupling 61 is not provided, the shaft and coupling are allowed to wobble relative to each other as they rotate. Therefore, rotational driving force is smoothly transmitted; rotational driving force is transmitted without causing vibrations. Also in the case of a structure in which play is provided in terms of the circumferential direction, the shaft and coupling are allowed to wobble relative to each other, and therefore, the same effects as those described above are realized, which is obvious.

Figure 10:
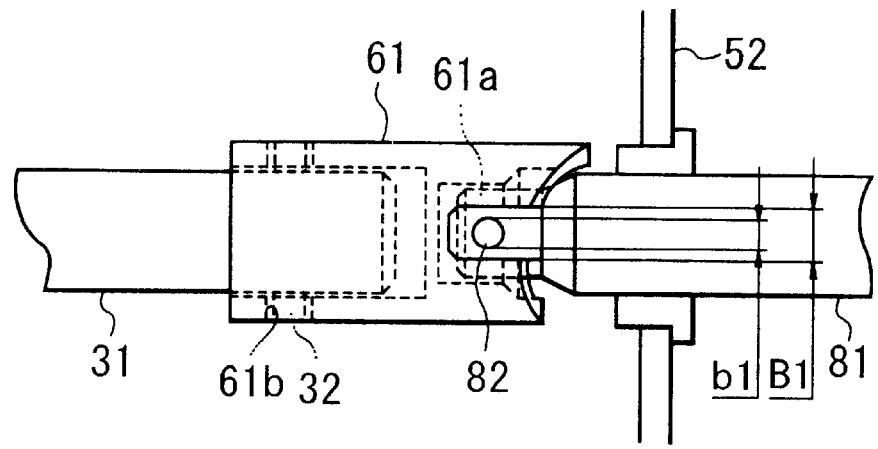
FIG. 10 is a phantom view of another version of the coupling of the driving force transmitting apparatus in the first embodiment of the present invention.

Next, referring to FIG. 10, the structure in which play is provided in terms of the circumferential direction will be concretely describe, regarding the shapes and measurements of the components related to the play.

The groove 61a in which the pin 82 of the drive shaft 81 fits has an U-shaped cross section, and its width B1 is in a range of, for example, 3–3.5 mm, whereas the width b1 of the pin 82, or the counterpart of the groove 61a, is 2 mm. Therefore, there is a generous amount of play between the pin 82 and the side walls of the groove 61a in terms of the circumferential direction.

Figure 11:
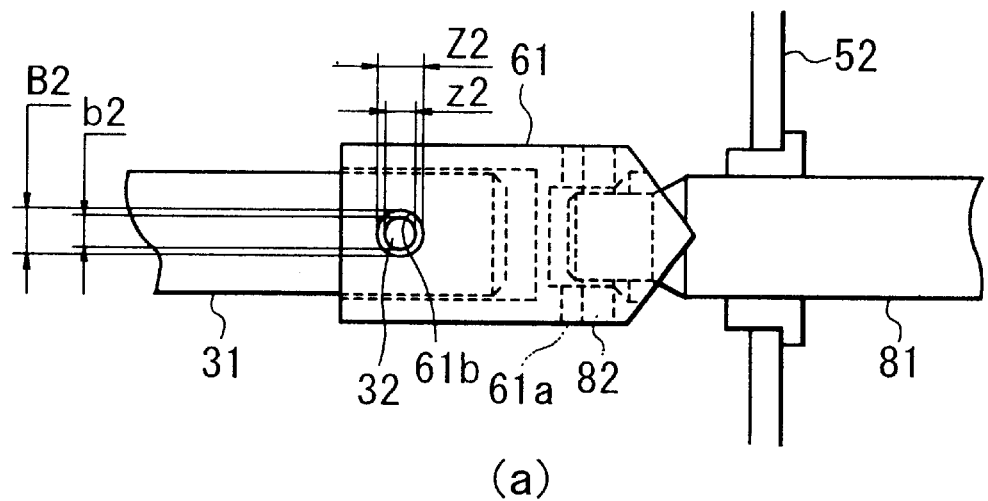
FIG. 11 is a phantom view of the another version of the coupling of the driving force transmitting apparatus in the first embodiment of the present invention.
Figure 11:
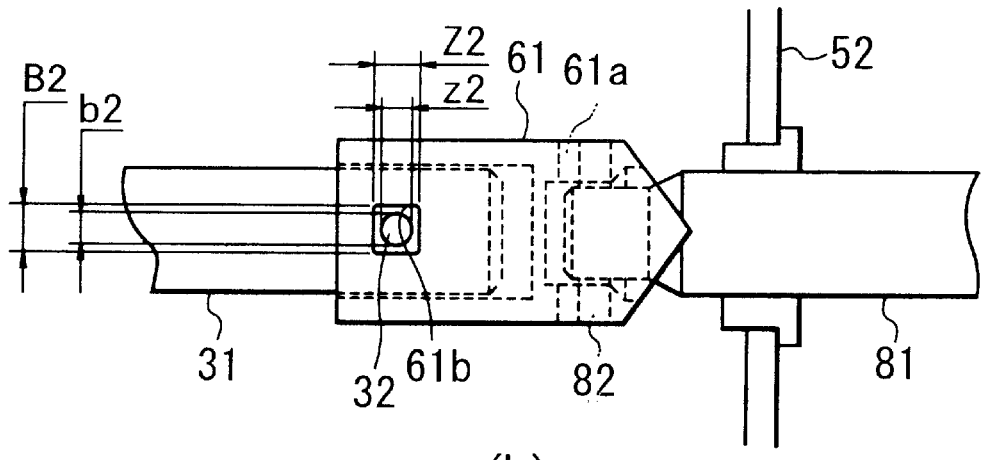

FIGS. 11(a) and 11(b) show examples of the shape of the hole 61b in which the pin 32 of the sleeve shaft 31 fits. The hole 61b is round or rectangular in cross section. The width B2 of the hole 61b is in a range of, for example, 3 mm, whereas the width b1 of the pin 32, or the counterpart of the hole 61b, is 2 mm. Therefore, there is a generous amount of play between the pin 32 and the wall of the hole 61b in terms of the circumferential direction.

The provision of play in the circumferential direction, on the drive shaft 81 side, allows the unit to be more smoothly inserted into, or removed from, the apparatus main assembly. The provision of play in the circumferential direction, on the sleeve shaft 31 side, makes it easier to put the pin 32 through the hole 61b when assembling the driving force transmitting portion, because the provision makes the diameter of the hole 61b larger.

Next, some of the methods for attaching the pins to the shaft will be described.

As the methods for attaching the pins, there are press-fitting methods and insert-fitting methods. In a press-fitting method, a parallel pin or a spring pin is pressed into a hole of a shaft. In the case of the structure in this embodiment, a press-fitting method is suitable for attaching the pins on the drive shaft 81 side. However, a press-fitting method is not suitable for attaching the pins on the sleeve shaft 31 side, in consideration of the removal of the coupling 61 and the assembly efficiency.

Figure 12:
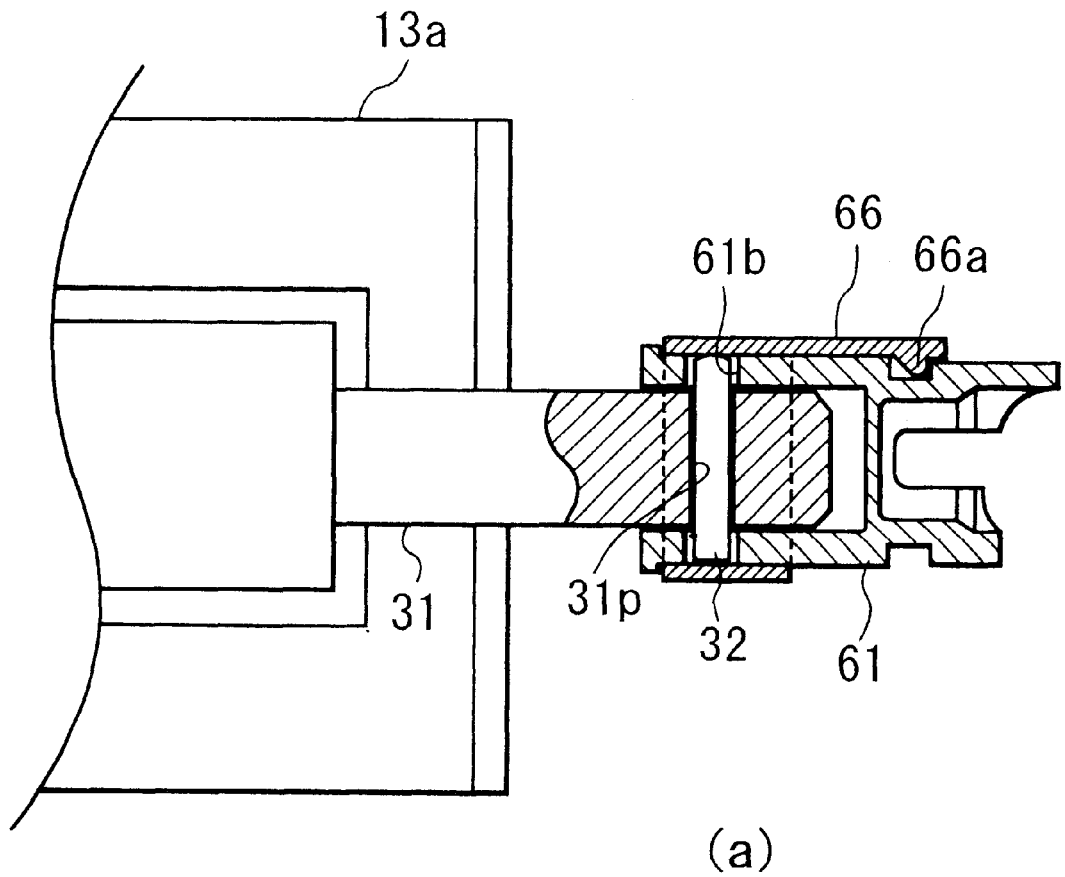
FIG. 12 is a sectional view of the coupling portion of the driving force transmitting apparatus in the first embodiment of the present invention, for showing the method for fitting a pin into the driving shaft of the driving force transmitting apparatus, and for retaining the pin therein.
Figure 12:
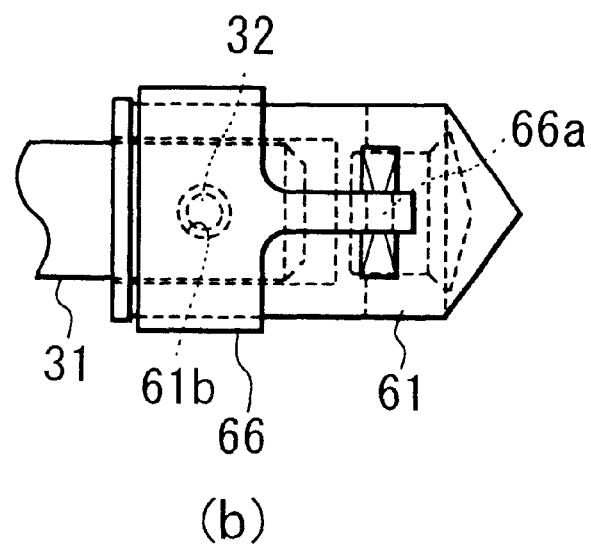

Next, an insert-fitting method will be described with reference to FIGS. 12(a) and 12(b). FIG. 12(b) is a plan view of the driving force transmitting portion in FIG. 12(a).

The diameter of the pin 32 is 2 mm, whereas the diameter of the hole 31p of the sleeve shaft 31 is rendered slightly larger than that of the pin 32, for example, 2.1 mm. The pin 32 is inserted into the hole 31p of the sleeve shaft 31 after the coupling 61 is fitted around the sleeve shaft 31. Next, in order to prevent the pin 32 from slipping out, a pin retainer 66 is attached to the coupling 61 to cover the hole 61b of the coupling 61 with the pin retainer 66. The pin retainer 66 is held to the coupling 61 with the use of a snap pawl 66a. Thus, the disengagement of the snap pawl 66a allows the pin retainer 66, pin 32, and coupling 61, to be removed in this order.

Although the above described structural arrangement is for attaching the coupling 61 to the sleeve shaft 31, the coupling 61 may be attached to the drive shaft 81 to provide the driving force transmitting portion with the same functions and effects as those described above.

Further, in the above described structural arrangement, the process cartridge 21 comprises the developing device 13, injection type charging device 14, and photosensitive drum 11. However, the structural arrangement for the process cartridge 21 to which the present invention is applicable is not limited to the above described one. In other words, the present invention is applicable to any process cartridge having a single or plurality of drive shafts to be driven.

Next, referring to FIGS. 16–21, the structural arrangement for fixing the drum cylinder 131 of the photosensitive drum 11 (11C, 11M, 11Y and 11K) to the drum shaft 51.

Figure 16:
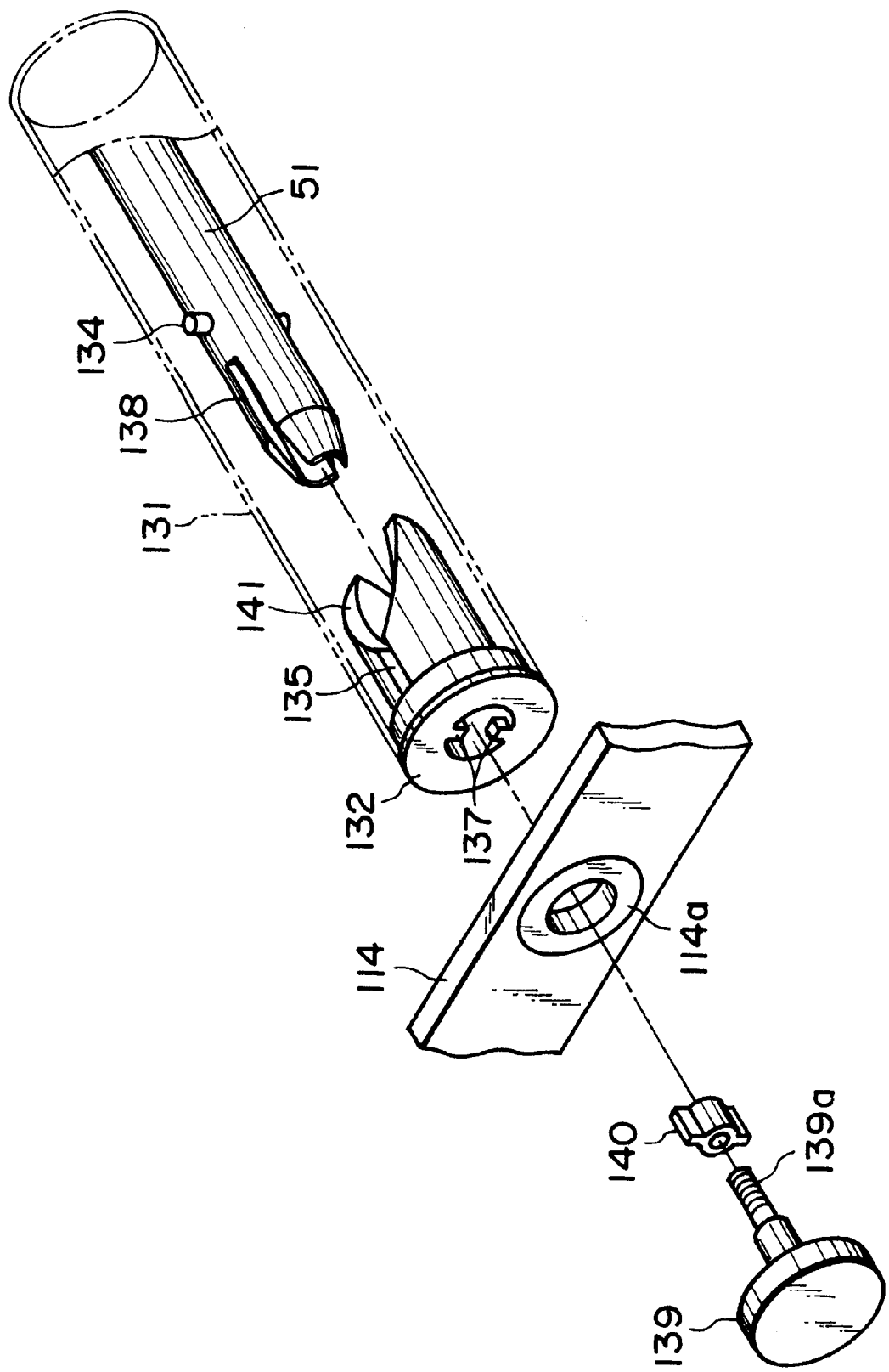
FIG. 16 is an exploded perspective view of a drum cylinder and a drum shaft, for showing the structure for fixing the two components to each other.
Figure 17:
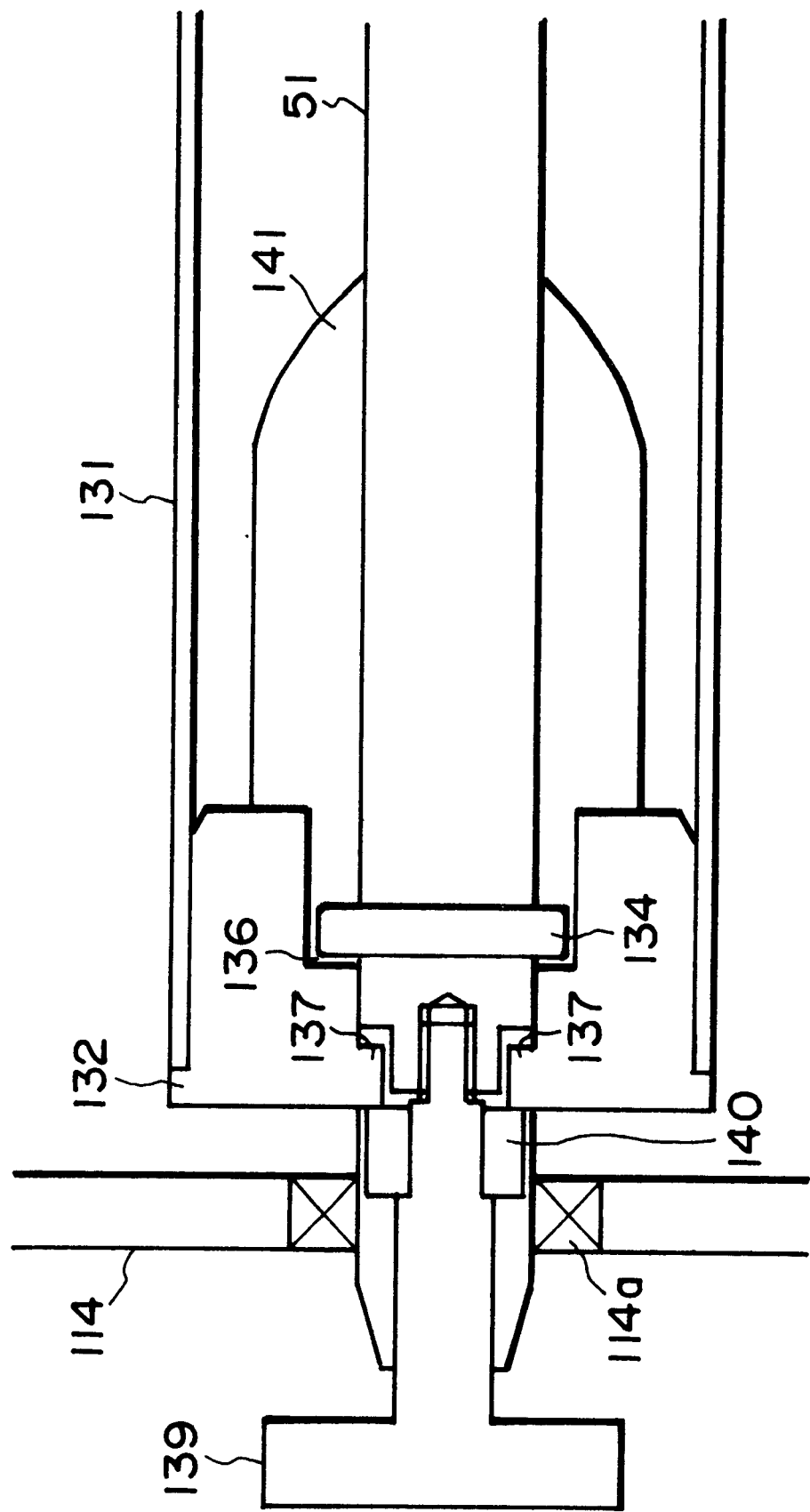
FIG. 17 is a sectional view of the drum cylinder, drum shaft, and their adjacencies, after the two components have been fixed to each other.
Figure 18:
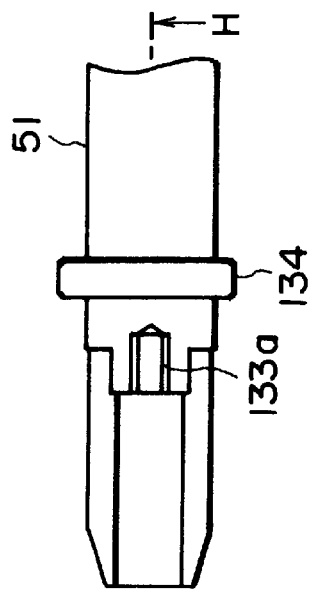
FIG. 18 is a sectional view of the drum cylinder and drum shaft, which are coincident in rotational phase, but are in separation.
Figure 18:
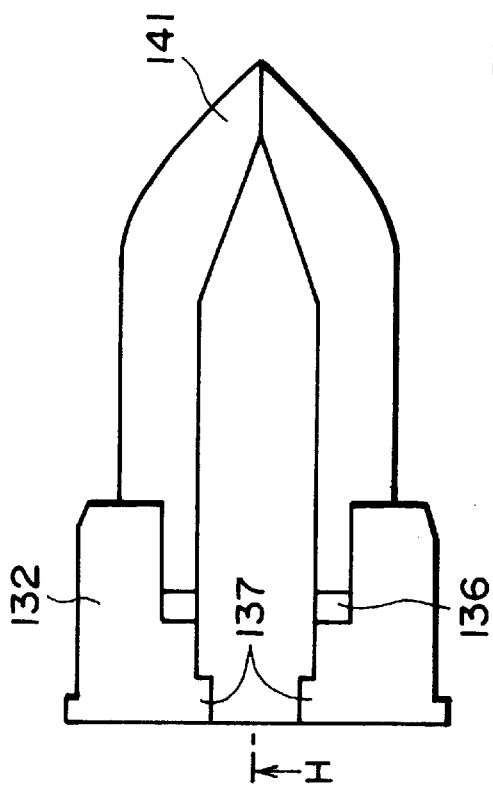
Figure 19:
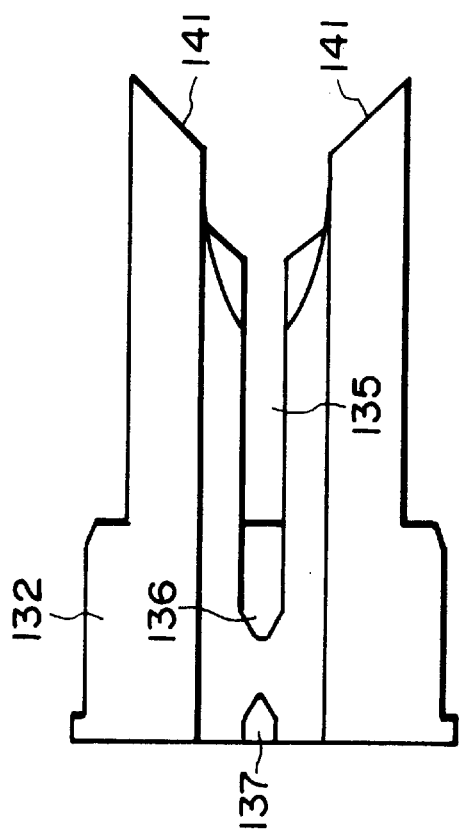
FIG. 19 is a sectional view of the drum cylinder and drum shaft, at a plane H—H in FIG. 18.
Figure 20:
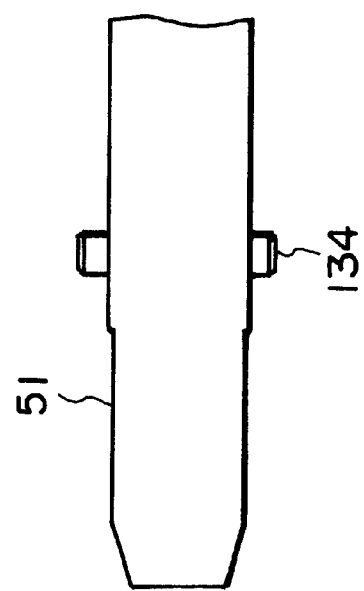
FIG. 20 is a side view of the drum cylinder and drum shaft.
Figure 21:
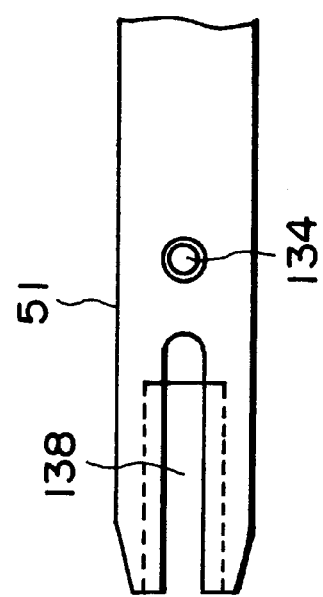
FIG. 21 is a plan view of the drum cylinder and drum shaft.

FIG. 16 is an exploded perspective view of the photosensitive drum 11 and its adjacencies, for showing the structural arrangement for fixing the drum cylinder 131 to the drum shaft 51, and FIG. 17 is a sectional view of one end of the photosensitive drum 11 and its adjacencies, for showing how the drum cylinder 131 and drum shaft 51 are fixed to each other. FIG. 18 is a sectional view of the drum cylinder and drum shaft, which are in separation, but are coincidental in rotational phase. FIG. 19 is a sectional view of the drum cylinder and drum shaft, at a plane H—H in FIG. 18. FIG. 20 is a side view of the drum cylinder and drum shaft and FIG. 21 is a plan view of the drum cylinder and drum shaft.

Referring to FIG. 16, a referential code 131 designates a drum cylinder. One end of the drum cylinder 131 is fitted with a drum flange 132, which is press-fitted into the drum cylinder 131. A referential code 51 designates a drum shaft, which is provided with a pin 134. The pin 134 is attached to the drum shaft 51 by press-fitting, and both end portions of the pin 134 project from the peripheral surface of the drum shaft 51 by a predetermined distance.

The drum flange 132 is provided with a pair of grooves 135 into which the end portions of the above described pin 134 loosely fit. Referring to FIGS. 18 and 19, the bottom end of each groove 135 is tapered in V-shape, constituting a V-shaped tapered portion 136. This tapered portion 136 is kept pressed upon the pin 134 of the drum shaft 51 by a pressure applying means, which will be described later, to take up the play between the drum flange 132 and drum shaft 51 in terms of their circumferential direction.

As this time, the means for applying pressure upon the drum cylinder 131 will be described.

The drum flange 132 is provided with two projections 137, which are on the front end of the drum flange 132, projecting inwardly in the radius direction of the drum flange 132, from the wall of the through hole which extends through the drum flange 132 in the axial direction of the drum flange 132, whereas the drum shaft 51 is provided with two slots 138, into which the two projections 137 of the drum flange 132 loosely fit one for one.

Referring gain to FIG. 16, designated by referential code 139 is a knob, the end portion 139a of which is threaded and is screwed into the female threaded hole 133a in the drum shaft 51. A referential code 140 stands for a guiding member, which is rotationally fitted around the knob 139. The external diameter of the guiding member 140 is rendered slightly smaller than the internal diameter of the drum shaft 51. Further, the guiding member 140 is provided with two projections 140a, which engage into the aforementioned slots 138 of the drum shaft 51. The height of each projection 140a of the guiding member 140 is made to be low enough to prevent the projection 140a from reaching beyond the peripheral surface of the drum shaft 51.

When the projections 137 of the drum flange 132 are in alignment with the slots 138 of the drum shaft 51 in terms of the axial direction of the drum cylinder 131, the drum shaft 51 is inserted into the drum flange 132 deep enough for the V-shaped tapered portions 136 to come into contact with the pins 134 press-fitted through the drum shaft 51.

Next, the knob 139 is put through the guiding member 140, and the threaded portion 139a of the knob 139 is screwed into the female-threaded hole 133a of the drum shaft 51. Prior to this process, the projections 140a of the guiding member 140 are aligned with the slots 138 of the drum shaft 51 in the axial direction of the drum cylinder 131.

Thus, although the movement of the guiding member 140 in the circumferential direction of the drum cylinder 131 is regulated by the slots 138 of the drum shaft 51, the guiding member 140 and knob 139 are enabled to freely rotate relative to each other. Therefore, there is nothing to interfere with the screwing of the knob 139 into the drum shaft 51. As the knob 139 is screwed into the drum shaft 51, the guiding member 140 is forced to gradually move toward the drum shaft 51. Eventually, the projections 140a of the guiding member 140 come into contact with the projections 137 of the drum flange 132, and presses the drum flange 132 in the inward direction of the drum shaft 51 in terms of the axial direction of the drum shaft 51.

Next, the mechanism for matching the drum flange 132 and drum shaft 51 in rotational phase will be described.

Referring to FIGS. 18 and 19, the inward end of the drum flange 132 is tapered like a lead cam. As the drum shaft 51 is inserted into the drum flange 132, the pins 134 projecting from the drum shaft 51 press against the surfaces 141 of the tapered portion, causing the drum flange 132 to rotate until the drum flange 132 and drum shaft 51 are matched in rotational phase, that is, until the pin 134 of the drum shaft 51 aligns with the grooves 135 of the drum flange 132 in the axial direction of the drum cylinder 131. When the pin 134 begins to be guided by the grooves 135, the projections 137 of the drum flange 132 are yet to engage into the slots 138 of the drum shaft 51, but the drum flange 132 and drum shaft 51 have been matched in rotational phase, making it possible for the drum shaft 51 to be inserted into the drum flange 132. As the drum shaft 51 is inserted further into the drum flange 132, the pin 134 of the drum shaft 51 comes into contact with the tapered portions 136 of the drum flange 132.

Thereafter, the knob 139, which has been put through the guiding member 140 as described above, is screwed into the female threaded hole 133a of the drum shaft 51 to complete the process for fixing the drum flange 132 and drum shaft 51 to each other.

As is evident from the above description, in this embodiment, the force for pressing the drum flange 132 and drum shaft 51 toward each other, and then keeping them pressed upon each other in terms of the axial direction of the drum cylinder 131, is transmitted to the drum flange 132 and drum shaft 51 through only the theoretical space occupied by the hypothetical extension of the drum shaft 51. Therefore, an ordinary bearing, the internal diameter of which is the same as the external diameter of the drum shaft 51 can be used as a bearing 114a fitted in an alignment plate 114 for supporting and accurately positioning the drum shaft 51, outside the drum flange 132. Further, the drum cylinder 131 and drum shaft 51 can be engaged to each other from outward side of the aligning plate 114.

<Embodiment 2>

Figure 22:
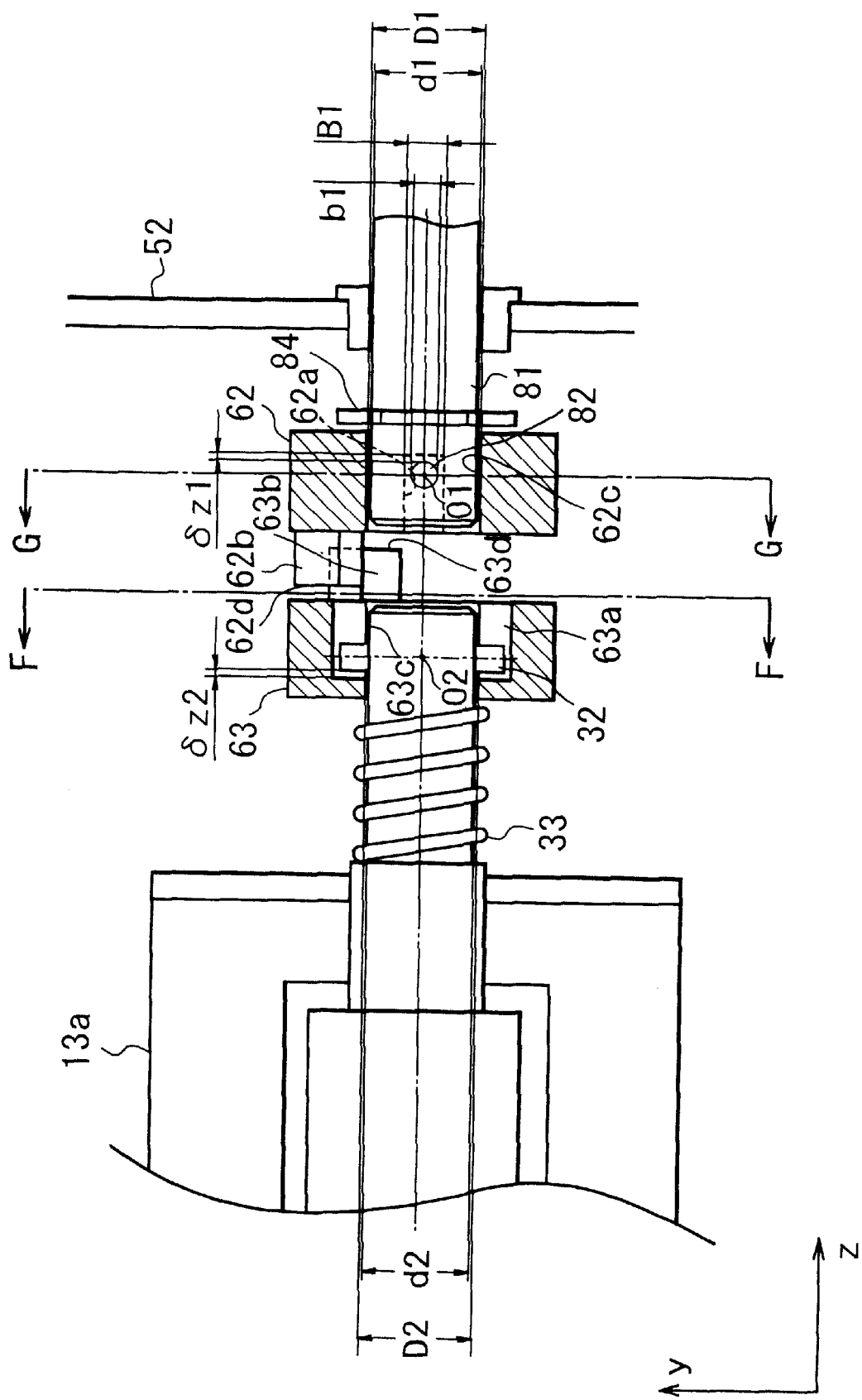
FIG. 22 is a sectional view of the driving force transmitting portion of the driving force transmitting apparatus in the second embodiment of the present invention, at the vertical plane inclusive of the axial line of the driving force transmitting portion, for showing the structure thereof.

Next, referring to FIGS. 22–25, the second embodiment of the present invention will be described. FIG. 22 is a sectional view of the driving force transmitting portion of the second embodiment of the driving force transmitting apparatus in accordance with the present invention, for depicting the structure thereof. In these drawings, the same components and portions as those in FIG. 1 are given the same referential codes as those in FIG. 1, and their descriptions will be omitted.

In the structure in this embodiment, the drive shaft 81 and sleeve shaft 31 are fitted with couplings 62 and 63, respectively.

The coupling 62 is provided with a groove 62a and a pair of pawls 62b as driving force transmitting portions. Into the groove 62a, the pin 82 of the drive shaft 81 fits, and the pawls 62b engages with the pawls 63b of the coupling 63 on the sleeve shaft 31 side to transmit driving force.

The coupling 62 is provided with a cylindrical portion 62c, which is fitted around the drive shaft 81 with an eternal diameter of d1, with the provision of a play in their radius direction, being therefore supported by the drive shaft 81. More specifically, the external diameter d1 of the drive shaft 81 is 8 mm, whereas the internal diameter D1 of the coupling 62 is 8.5 mm.

The coupling 62 is loosely held to the drive shaft 81 with the use of a pin 82 and an E-shaped retainer ring 84. The amount of the play δz1 between the pin 82 and the walls of the groove 62a is 0.5 mm.

The provision of play in both the radius and axial directions allows the coupling 62 to pivot about both the axis x perpendicular to the plane of FIG. 22, and the axis y parallel to the vertical direction in the drawing, allowing therefore the coupling 62 and the drive shaft 81 to pivot relative to each other. More specifically, the coupling 62 is allowed to wobble relative to the drive shaft 81, with the intersection O1 between the axial line of the pin 82 and the axial line of the drive shaft 81 functioning like a fulcrum, as they rotate.

In this embodiment, the width b1 of the pin 82 and the width B1 of the groove 62a are made to be 2 mm and 3 mm, respectively, to provide a certain amount of play between the pin 82 and the walls of the groove 62a to improve assembly efficiency as in the first embodiment.

On the other hand, the coupling 63 on the sleeve shaft 31 side is fitted around the sleeve shaft 31, with the provision of play between the pin 32 and the walls of the groove 63a in both the radius direction of the pin 32 and the axial direction of the sleeve shaft 31, as is the coupling 62 on the drive shaft 81 side. The external diameter d2 of the sleeve shaft 31 is 8 mm, whereas the internal diameter D2 of the cylindrical portion 63c of the coupling 63 is 8.5 mm. The play δz2 between the pin 32 and the walls of the groove 63a in the axial direction of the sleeve shaft 31 is 0.5 mm. Therefore, the coupling 63 is allowed to wobble relative to the sleeve shaft 31, with the intersection O2 between the axial line of the pin 32 and the axial line of the sleeve shaft 31 functioning like a fulcrum.

With the provision of the above described structural arrangement, the two coupling 62 and 63 are either firmly connected to each other and rotate like a single coupling, or are loosely connected to each other and rotate while being afforded a certain amount of latitude in terms of the alignment between their axial lines. In the former case, the driving force transmitting portion in this embodiment functions like the driving force transmitting portion in the first embodiment (only a coupling 61), whereas in the latter case, the driving force transmitting portion in this embodiment is afforded a higher level of latitude in terms of the alignment between their axial lines.

In either case, when the drive shaft 81 and sleeve shaft 31 are not in alignment with each other, the axial lines of the drive shaft 81 and coupling 62 intersect at the point at which driving force is transmitted (contact point between the pin 32 and the wall of the groove 63a), and so do the axial lines of the sleeve shaft 31 and coupling 63. Therefore, a plurality of the contact points, which are on the same cylindrical plane, and at which driving force is transmitted, become equal in the amount of driving force to be transmitted; driving force is evenly distributed among the plurality of driving force transmission points, as it is transmitted. Consequently, driving force, or torque, is simply transmitted as torque, without being partially turned into unwanted force, or the vibration causing force, as it is transmitted. Therefore, vibrations do not occur. As is evident from the above description, this embodiment can also prevent driving force from being partially turned into the vibration causing force as it is transmitted, preventing therefore the occurrence of the vibration.

Next, the process in which the couplings 62 and 63 are engaged with each other as the process cartridge 21 is mounted will be described.

The coupling 63 is structured so that it can be slid toward the sleeve shaft 31 in its axial direction. A spring 33 is a compression spring for exerting rightward pressure upon the coupling 63 as the coupling 63 is moved leftward in FIG. 22. When the coupling 63 is at the normal position as shown in FIG. 22, it is in its natural sate, exerting no pressure upon the coupling 63. Therefore, the provision of the spring 33 does not eliminates the play δz2, assuring the presence of the play δz2.

Figure 23:
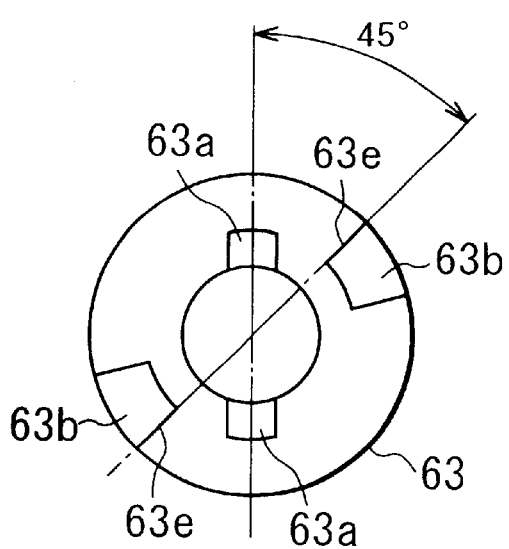
FIG. 23 is a sectional view of the driving force transmitting portion of the second embodiment of the driving force transmitting apparatus in accordance with the present invention, at the plane F—F in FIG. 22.

FIG. 23 is a plan view of the driving force transmitting portion as seen from a plane F—F in the direction indicated by arrow marks. The end surface of the coupling 63 is provided with a pair of pawls 63b (FIG. 22 shows only one of the pair of pawls since it is a sectional view). The end surface 63d of each pawl 63d is flat and is perpendicular to the axial line of the coupling 63. The driving force transmission surface 63e aligns with the axial line of the coupling 63 in terms of the radius direction of the coupling 63.

The reason why the pawl 63b is given the flat end instead of a pointed one is for preventing the couplings 62 and 63 from improperly engaging with each other (misalignment between the pawls 62b and 63b). More specifically, when the couplings 62 and 63 are in the proper alignment with each other, the pawls 62b of the coupling 62 and the pawls 63b of the coupling 63 are alternately positioned in terms of the circumferential direction of the two couplings. However, if the end portions of the pawls 62b and 63b are pointed, the pawls 62b and 63b sometimes fail to be alternately positioned in terms of the circumferential direction of the two couplings. This problem occurs when the centers of the couplings 62 and 63 fail to align with each other in terms of the axial direction of the two couplings because of the misalignment between the axial lines of the couplings 62 and 63 and/or the tilting of the couplings 62 and 63 relative to the axial lines of the drive shaft 81 and sleeve shaft 31, respectively.

Making the end surface of the pawls 62b and 63b flat can prevent the aforementioned improper engagement between the couplings 62 and 63. However, it is likely to cause the ends 62d and 63d of the pawls 62 and 63, respectively, to collide head-on with each other. This is why the coupling 63 is enabled to retreat in its axial direction in this embodiment. With the provision of this structural arrangement, as the two couplings collide head-on, the coupling 63 retreats while exerting pressure upon the spring 33. Then, as the two couplings are made to coincide in rotational phase, by the rotation of the drive shaft 81, the pawls 62b and 63b properly engage with each other as the coupling 63 is returned to the normal position by the resiliency of the spring 33.

As is evident from the above description, the present invention is also applicable to a drive train in which the two shafts are not allowed to rotate relative to each other.

The drive train in the first embodiment is an example of a drive train in which the two shafts are allowed to rotate relative to each other. Even if a drive than in which the two shafts are not allowed to rotate relative to each other is provided with only one coupling, the present invention can be embodied by enabling the coupling to slide in its axial direction as described above.

In this embodiment, the operational effects, which will be described below, can be realized by specifying the shapes (phase) of the components.

Referring to FIG. 23, the driving force transmission surface 63e of the coupling 63, and the groove 63a, are differentiated in rotational phase by 45 deg. Further, the couplings 62 and 63 are rendered the same in as many component as possible, so that common components can be used.

Figure 24:
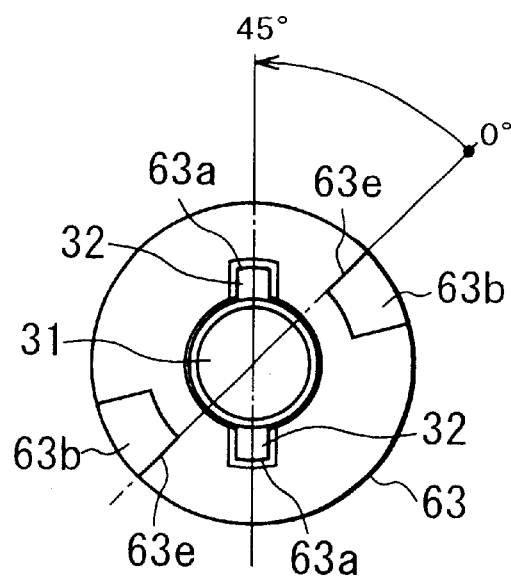
FIG. 24 is a sectional view of the driving force transmitting portion of the second embodiment of the driving force transmitting apparatus in accordance with the present invention, at the plane F—F in FIG. 22.

FIG. 24 is a plan view of the portion of the driving force transmitting portion indicated by a line F—F, as seen from the direction indicated by the arrow marks, and depicts the coupling 63 and sleeve shaft 31. As shown in FIG. 24, the pin 32 of the sleeve shaft 31 is positioned 45 deg. away from the driving force transmission surface 63e of the coupling 63 in the counterclockwise direction.

Figure 25:
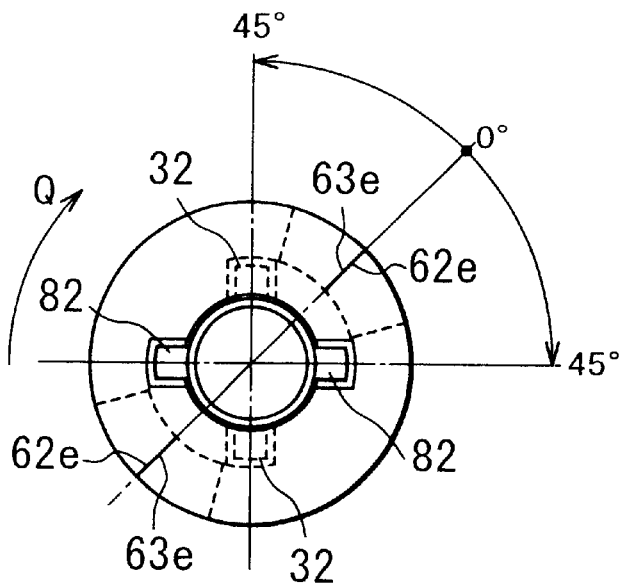
FIG. 25 is a sectional view of the driving force transmitting portion of the second embodiment of the driving force transmitting apparatus in accordance with the present invention, at the plane G—G in FIG. 22.

FIG. 25 is a phantom plan view of the couplings 62 and 63 as seen from the portion indicated by a line G—G in FIG. 22, from the direction indicated by the arrow marks, and shows together the two couplings 62 and 63 and two pins 32 and 82. An arrow mark Q indicates the rotational direction of the driving force transmitting portion. The pin 82 of the drive shaft 81 is positioned 45 deg. apart from the driving force transmission surfaces 62e and 63e of the two couplings 62 and 63, respectively, in terms of the clockwise direction. Therefore, the pin 82 of the drive shaft 81 and the pin 32 of the sleeve shaft 31 are differentiated by 90 deg. (45 deg.+45 deg.) in rotational phase (the two pins 82 and 32 are perpendicular to each other).

Since the pins 32 and 82 are differentiated by 90 deg. in rotational phase (perpendicular to each other), the same mechanism as the above described mechanism in the first embodiment prevents the rotational load from fluctuating. Therefore, problems such as irregular rotation does not occur. Further, in this embodiment, the same functional effects as those realized by the first embodiment can be realized while using the common components for the drive shaft side and sleeve shaft side.

As described above, in this embodiment, in order to prevent the rotational velocity of the photosensitive member subjected to image exposure, from fluctuating, the sleeve shaft of the photosensitive member is enabled to be accurately connected to the drive shaft on the apparatus main assembly side, to make the rotational centers of the sleeve shaft and drive shaft coincide.

Further, a slight difference in peripheral velocity between the charge sleeve and development sleeve does not affect image quality. Therefore, the driving force transmitting portion is structured so that driving force can be transmitted from the driving shaft to the driven shaft, which do not coincide with the drive shaft in rotational axis. Therefore, even if the photosensitive, charge sleeve, or development sleeve, is slightly misaligned from the corresponding drive shaft, vibrations do not occur.

The application of the present invention is not limited to the structural components of an image forming apparatus, which have the above described measurements, materials, shapes, and positional relationship, unless specific notations are provided.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus comprising:

a process cartridge detachably mountable to a main assembly of said apparatus, said process cartridge including an image bearing member for bearing an electrostatic image and process means actable on said image bearing member, said process means having a rotational shaft;

a driving shaft, substantially co-axial with said rotational shaft, for rotating said rotational shaft;

a drive transmitting member, engaged with said driving shaft and with said rotational shaft, for transmitting a driving force to said rotational shaft from said driving shaft; and an image bearing member rotating shaft, wherein said image bearing member is engaged with said image bearing member rotating shaft substantially without play, and wherein said drive transmitting member is engaged with said driving shaft with play and is engaged with said rotational shaft with play.

2. An apparatus according to claim 1, wherein said process cartridge includes a plurality of said process means each having said rotational shaft, and includes said drive transmitting member for each of said process means.

3. An apparatus according to claim 2, wherein said process means are charging means for electrically charging said image bearing member and developing means for developing an electrostatic image on said image bearing member.

4. An apparatus according to claim 1, wherein said process means includes a rotatable member which is rotated at a peripheral speed which is different from that of said image bearing member.

5. An apparatus according to claim 1, wherein said drive transmitting member is pivotable about a point on an axis of said driving shaft and a point on an axis of said rotational shaft.

6. An apparatus according to claim 5, wherein an angle through which said drive transmitting member is pivotable relative to each of said driving shaft and said rotational shaft is larger than a smaller one of a conjugate angle formed between said drive transmitting member and said driving shaft and a conjugate angle formed between said drive transmitting member and said rotational shaft.

7. An apparatus according to claim 1, wherein said drive transmitting member is provided with grooves for engagement with said driving shaft and said rotational shaft, respectively, and said driving shaft and said rotational shaft are provided with projections for engagement with said grooves, respectively.

8. An apparatus according to claim 7, wherein said groove of said drive transmitting member engageable with said driving shaft and said groove of said drive transmitting member engageable with said rotational shaft are extended in different directions.

9. An apparatus according to claim 8, wherein said directions are orthogonal to each other.

10. An apparatus according to claim 7, wherein said drive transmitting member is provided with a step for preventing abutment of said driving shaft or said rotational shaft to said drive transmitting member.

11. An apparatus according to claim 1, wherein said drive transmitting member is coupled with one of said driving shaft and said rotational shaft.

12. An apparatus according to claim 11, wherein said drive transmitting member is demountable from said driving shaft or said rotational shaft to which said drive transmitting member is mounted.

13. An apparatus according to claim 1, wherein said drive transmitting member comprises two members which are movable toward and away from each other, and said two members are coupled with said driving shaft and said rotational shaft, respectively.

14. An apparatus according to claim 13, wherein said two members have the same shape.

15. An apparatus according to claim 13, wherein said drive transmitting member is provided with a groove which is brought into engagement with said driving shaft by rotation of said rotational shaft relative to said driving shaft.

16. An apparatus according to claim 15, wherein said groove is disposed approximately 45° away from a driving force transmission surface of said drive transmission member as seen from an axis of said driving shaft or said rotational shaft.

17. An image forming apparatus comprising:

a process cartridge detachably mountable to a main assembly of said apparatus, said process cartridge including an image bearing member for bearing an electrostatic image and process means actable on said image bearing member, said process means having a rotational shaft;

a driving shaft, substantially co-axial with said rotational shaft, for rotating said rotational shaft; and a drive transmitting member, engaged with said driving shaft and with said rotational shaft, for transmitting a driving force to said rotational shaft from said driving shaft, wherein said drive transmitting member is engaged with said driving shaft with play and is engaged with said rotational shaft with play, and wherein the play is not less than 200 $\mu$m at portions where said drive transmitting member and said driving shaft are engaged with each other, and where said drive transmitting member and said rotational shaft are engaged with each other.

18. An image forming apparatus comprising:

a process cartridge detachably mountable to a main assembly of said apparatus, said process cartridge including an image bearing member for bearing an electrostatic image and process means actable on said image bearing member, said process means having a rotational shaft;

a driving shaft, substantially co-axial with said rotational shaft, for rotating said rotational shaft; and a drive transmitting member, engaged with said driving shaft and with said rotational shaft, for transmitting a driving force to said rotational shaft from said driving shaft, wherein said drive transmitting member is engaged with said driving shaft with play and is engaged with said rotational shaft with play, wherein said drive transmitting member is provided with grooves for engagement with said driving shaft and said rotational shaft, respectively, and said driving shaft and said rotational shaft are provided with projections for engagement with said grooves, respectively, and wherein said drive transmitting member is provided with a tapered portion for guiding engagement of one of said projections into one of said grooves.

19. An apparatus according to claim 18, wherein said drive transmitting member is provided with another tapered portion which has a height different from the height of said tapered portion.

20. A process cartridge detachably mountable to an image forming apparatus, said process cartridge comprising:

an image bearing member for bearing an electrostatic image;

process means actable on said image bearing member, said process means including a rotational shaft;

a drive transmitting member for receiving a driving force from a driving shaft provided in a main assembly of the apparatus; and an image bearing member rotating shaft, wherein said image bearing member is engaged with said image bearing member rotating shaft substantially without play, and wherein said drive transmitting member is engaged with said driving shaft with play and is engaged with said rotational shaft with play.

21. A process cartridge according to claim 20, wherein said process cartridge includes a plurality of said process means each having said rotational shaft, and includes said drive transmitting member for each of said process means.

22. A process according to claim 21, wherein said process means are charging means for electrically charging said image bearing member and developing means for developing an electrostatic image on said image bearing member.

23. A process cartridge according to claim 20, wherein said process means includes a rotatable member which is rotated at a peripheral speed which is different from that of said image bearing member.

24. A process cartridge according to claim 20, wherein said drive transmitting member is pivotable about a point on an axis of said driving shaft and a point on an axis of said rotational shaft.

25. A process cartridge according to claim 24, wherein an angle through which said drive transmitting member is pivotable relative to each of said driving shaft and said rotational shaft is larger than a smaller one of a conjugate angle formed between said drive transmitting member and said driving shaft and a conjugate angle formed between said drive transmitting member and said rotational shaft.

26. A process cartridge according to claim 20, wherein said drive transmitting member is provided with grooves for engagement with said driving shaft and said rotational shaft, respectively, and said driving shaft and said rotational shaft are provided with projections for engagement with said grooves, respectively.

27. A process cartridge according to claim 26, wherein said groove of said drive transmitting member engageable with said driving shaft and said groove of said drive transmitting member engageable with said rotational shaft are extended in different directions.

28. A process cartridge according to claim 27, wherein said directions are orthogonal to each other.

29. A process cartridge according to claim 26, wherein said drive transmitting member is provided with a step for preventing abutment of said driving shaft or said rotational shaft to said drive transmitting member.

30. A process cartridge according to claim 20, wherein said drive transmitting member is coupled with one of said driving shaft and said rotational shaft.

31. A process cartridge according to claim 30, wherein said drive transmitting member is demountable from said driving shaft or said rotational shaft to which said drive transmitting member is mounted.

32. A process cartridge according to claim 20, wherein said drive transmitting member comprises two members which are movable toward and away from each other, and said two members are coupled with said driving shaft and said rotational shaft, respectively.

33. A process cartridge according to claim 32, wherein said two members have the same shape.

34. A process cartridge according to claim 32, wherein said drive transmitting member is provided with a groove which is brought into engagement with the driving shaft by rotation of said rotational shaft relative to said driving shaft.

35. A process cartridge according to claim 34, wherein said groove is disposed approximately 45° away from a driving force transmission surface of said drive transmitting member as seen from an axis of said driving shaft or said rotational shaft.

36. A process cartridge detachably mountable to an image forming apparatus, said process cartridge comprising:

an image bearing member for bearing an electrostatic image;

process means actable on said image bearing member, said process means including a rotational shaft; and a drive transmitting member for receiving a driving force from a driving shaft provided in a main assembly of the apparatus, wherein said drive transmitting member is engaged with said driving shaft with play and is engaged with said rotational shaft with play, and wherein the play is not less than 200 $\mu$m at portions where said drive transmitting member and said driving shaft are engaged with each other, and where said drive transmitting member and said rotational shaft are engaged with each other.

37. A process cartridge detachably mountable to an image forming apparatus, said process cartridge comprising:

an image bearing member for bearing an electrostatic image;

process means actable on said image bearing member, said process means including a rotational shaft; and a drive transmitting member for receiving a driving force from a driving shaft provided in a main assembly of the apparatus, wherein said drive transmitting member is engaged with said driving shaft with play and is engaged with said rotational shaft with play, wherein said drive transmitting member is provided with grooves for engagement with said driving shaft and said rotational shaft, respectively, and said driving shaft and said rotational shaft are provided with projections for engagement with said grooves, respectively, and wherein said drive transmitting member is provided with a tapered portion for guiding engagement of one of the projections into one of the grooves.

38. A process cartridge according to claim 37, wherein said drive transmitting member is provided with another tapered portion which has a height different from the height of said tapered portion.

* * * * *

UNITED STATES PATENT AND TRADEMARK OFFICE
CERTIFICATE OF CORRECTION

PATENT NO. : 6,574,446 B2
DATED : June 3, 2003
INVENTOR(S) : Kunihiko Kitayama

It is certified that error appears in the above-identified patent and that said Letters Patent is hereby corrected as shown below:

Column 7,
Line 49, "are" should read -- is --.

Column 8,
Line 60, "undesirably" should read -- undesirable --.

Column 12,
Line 35, "As" should read -- At --.

Signed and Sealed this

Fifteenth Day of June, 2004

JON W. DUDAS
*Acting Director of the United States Patent and Trademark Office*